(12) United States Patent
Schultink et al.

(10) Patent No.: US 6,171,369 B1
(45) Date of Patent: Jan. 9, 2001

(54) VACUUM CLEANER BAG CONSTRUCTION AND METHOD OF OPERATION

(75) Inventors: Bas Schultink, Overpelt; Jan Schultink, Eksel, both of (BE)

(73) Assignee: Airflo Europe, N.V. (BE)

(*) Notice: Under 35 U.S.C. 154(b), the term of this patent shall be extended for 0 days.

(21) Appl. No.: 09/306,883

(22) Filed: May 7, 1999

Related U.S. Application Data

(60) Provisional application No. 60/085,032, filed on May 11, 1998, provisional application No. 60/096,039, filed on Aug. 11, 1998, and provisional application No. 60/106,143, filed on Oct. 29, 1998.

(51) Int. Cl.[7] .................................................. B03C 3/011
(52) U.S. Cl. .................................. 95/57; 15/347; 15/352; 55/382; 55/486; 55/487; 55/DIG. 2; 55/DIG. 39; 95/78; 95/287; 96/15; 96/69
(58) Field of Search ................................. 95/57, 78, 286, 95/287; 96/15, 65, 66, 69; 55/382, 528, 485–487, DIG. 2, DIG. 3, DIG. 5, DIG. 39; 264/DIG. 48; 428/340, 903; 442/389; 15/347, 352

(56) References Cited

U.S. PATENT DOCUMENTS

| | | | |
|---|---|---|---|
| 3,971,373 | 7/1976 | Braun | 128/146.2 |
| 4,116,648 | 9/1978 | Busch | 55/276 |
| 4,164,400 | 8/1979 | Wald | 55/382 |
| 4,215,682 | 8/1980 | Kubik et al. | 128/205.29 |
| 4,257,791 | 3/1981 | Wald | 55/382 |
| 4,375,718 | 3/1983 | Wadsworth et al. | 29/592 E |
| 4,429,001 | 1/1984 | Kolpin et al. | 428/283 |
| 4,589,894 | 5/1986 | Gin et al. | 55/274 |

(List continued on next page.)

FOREIGN PATENT DOCUMENTS

| | | | |
|---|---|---|---|
| 195 44 790 A1 | 6/1997 | (DE) . | |
| 0 338 479 A1 | 10/1989 | (EP) . | |
| 0 161 790 B1 | 2/1990 | (EP) . | |
| 0 375 234 A1 | 6/1990 | (EP) . | |
| 0 477 007 A1 | 3/1992 | (EP) . | |
| 0 582 286 A1 | 2/1994 | (EP) . | |
| 0 639 061 A1 | 5/1997 | (EP) . | |
| 0 893 151 A2 | 4/1998 | (EP) . | |
| 55-67314 | * 5/1980 | (JP) | 55/487 |
| WO 97/30772 | 8/1997 | (WO) . | |
| WO 98/11282 | 3/1998 | (WO) . | |

OTHER PUBLICATIONS

American Allergy Supply—3M Filtrete Vacuum Filter Bags Internet Web Publication http://www.neosoft.com/users/s/sreifler/3mbagidx.htm Copyright 1994–1997.

Primary Examiner—Richard L. Chiesa
(74) Attorney, Agent, or Firm—Schnader Harrison Segal & Lewis, LLP

(57) ABSTRACT

A disposable vacuum cleaner filter bag is constructed of layers which include a filtration grade meltblown fleece layer having a basis weight of about 10–50 g/m$^2$ and air permeability of about 100–1000 L/(m$^2$×s) and a coarse filter layer in which the coarse filter layer is placed upstream of the filtration grade meltblown fleece layer. The coarse filter layer can include either wet-laid high dust capacity paper, dry-laid high dust capacity paper, high bulk meltblown nonwoven, Spunblown (Modular) nonwoven or microdenier spunbond nonwoven. Juxtaposition of the layers causes the coarse filter layer to capture large dirt particles and permits the filtration grade meltblown fleece layer to capture much of the remaining dust particles. The novel bag exhibits high air permeability and low pressure drop at high dust loading. A method of filtering gas through such a filter is also disclosed.

25 Claims, 21 Drawing Sheets

U.S. PATENT DOCUMENTS

| | | | |
|---|---|---|---|
| 5,080,702 | 1/1992 | Bosses | 55/382 |
| 5,230,800 | 7/1993 | Nelson | 210/496 |
| 5,244,703 | 9/1993 | Bosses | 428/35.2 |
| 5,306,534 | 4/1994 | Bosses | 428/35.2 |
| 5,419,953 | 5/1995 | Chapman | 428/284 |
| 5,437,910 | 8/1995 | Raabe et al. | 428/194 |
| 5,647,881 | 7/1997 | Zhang et al. | 55/382 |
| 5,672,188 | 9/1997 | Choi | 55/485 |
| 5,730,923 | 3/1998 | Hassenboehler, Jr. et al. | 264/479 |
| 5,785,725 * | 7/1998 | Cusick et al. | 55/382 |
| 6,045,595 * | 4/2000 | Freudenberg | 55/382 |

* cited by examiner

BAG CONSTRUCTION EXAMPLE 1

TRADITIONAL VACUUM CLEANER BAG CONSTRUCTION CONSISTING OF WET-LAID
SUPPORTING FLEECE (INSIDE OF BAG) AND WET-LAID FILTER PAPER (AIR OUTLET SIDE)

TWO-LAYER VACCUM CLEANER BAG CONSTRUCTION IN WHICH MELTBLOWN ULTRAFINE FIBER FLEECE ON THE INSIDE OF THE BAG SERVES AS BOTH THE DUST HOLDING AND FILTRATION COMPONENT

THREE-LAYER VACUUM CLEANER BAG IN WHICH A WET-LAID SUPPORTING FLEECE WITH VERY LITTLE DUST HOLDING CAPACITY IS ADDED TO PROTECT THE MELTBLOWN FLEECE FROM ABRASION.

BAG CONSTRUCTION EXAMPLE 4

INVENTIVE NEW THREE-LAYER VACUUM CLEANER BAG CONSTRUCTION IN WHICH A SPECIAL BULKY MELTBLOWN IS PLACED IN FRONT OF MELTBLOWN FLEECE AND THE SPUNBOND LAYER IS PLACED ON THE OUTSIDE OF THE BAG.

BAG CONSTRUCTION EXAMPLE 5

INVENTIVE NEW THREE-LAYER VACUUM CLEANER BAG CONSTRUCTION IN WHICH WET-LAID SPECIAL FILTER PAPER IS PLACED IN FRONT OF MELTBLOWN FLEECE AND THE SPUNBOND-, DRY-LAID-, OR WET LAID LAYER OR OTHER SUITABLE TYPE OF NONWOVEN SCRIM, IS PLACED ON THE OUTSIDE OF THE BAG.

BAG CONSTRUCTION EXAMPLE 6

INVENTIVE NEW THREE-LAYER VACUUM CLEANER BAG CONSTRUCTION IN WHICH DRY-LAID SPECIAL FILTER PAPER IS PLACED IN FRONT OF MELTBLOWN FLEECE AND THE SPUNBOND LAYER IS PLACED ON THE OUTSIDE OF THE BAG.

INVENTIVE NEW THREE-LAYER VACUUM CLEANER BAG CONSTRUCTION IN WHICH WET-LAID SPECIAL FILTER PAPER IS PLACED IN FRONT OF MELTBLOWN FLEECE AND THE CARBON WITH FLEECE IS PLACED ON THE OUTSIDE OF THE BAG.

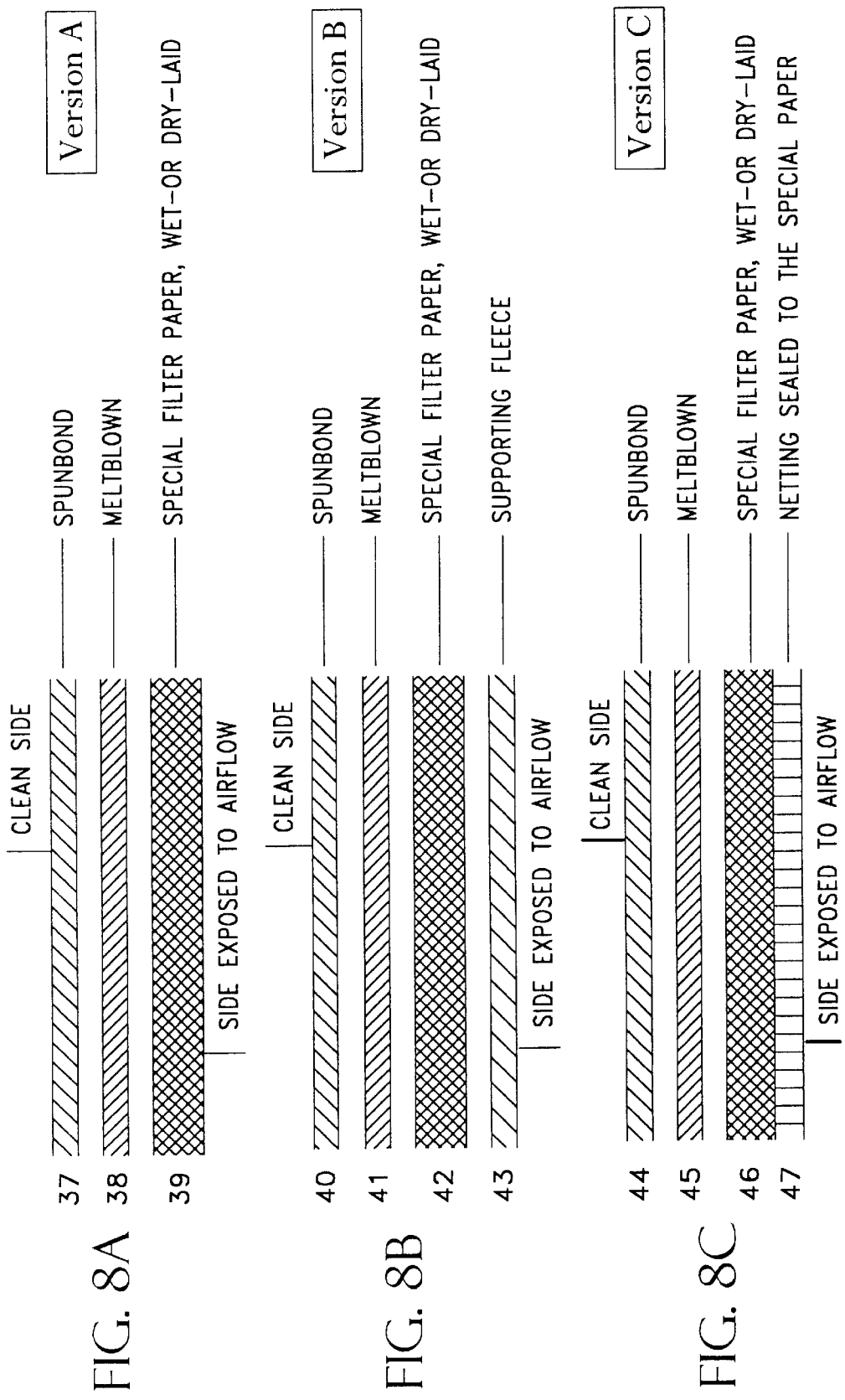

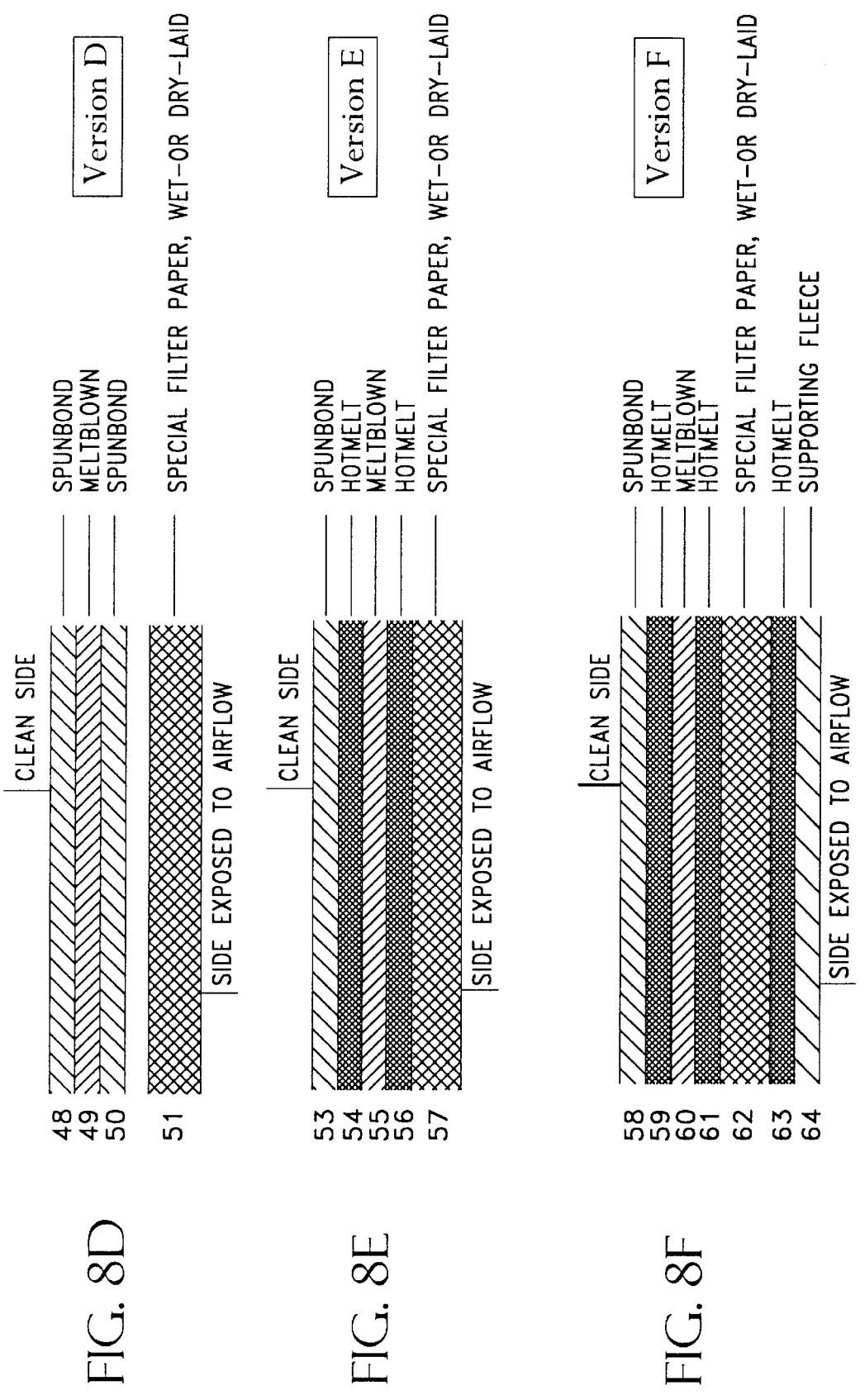

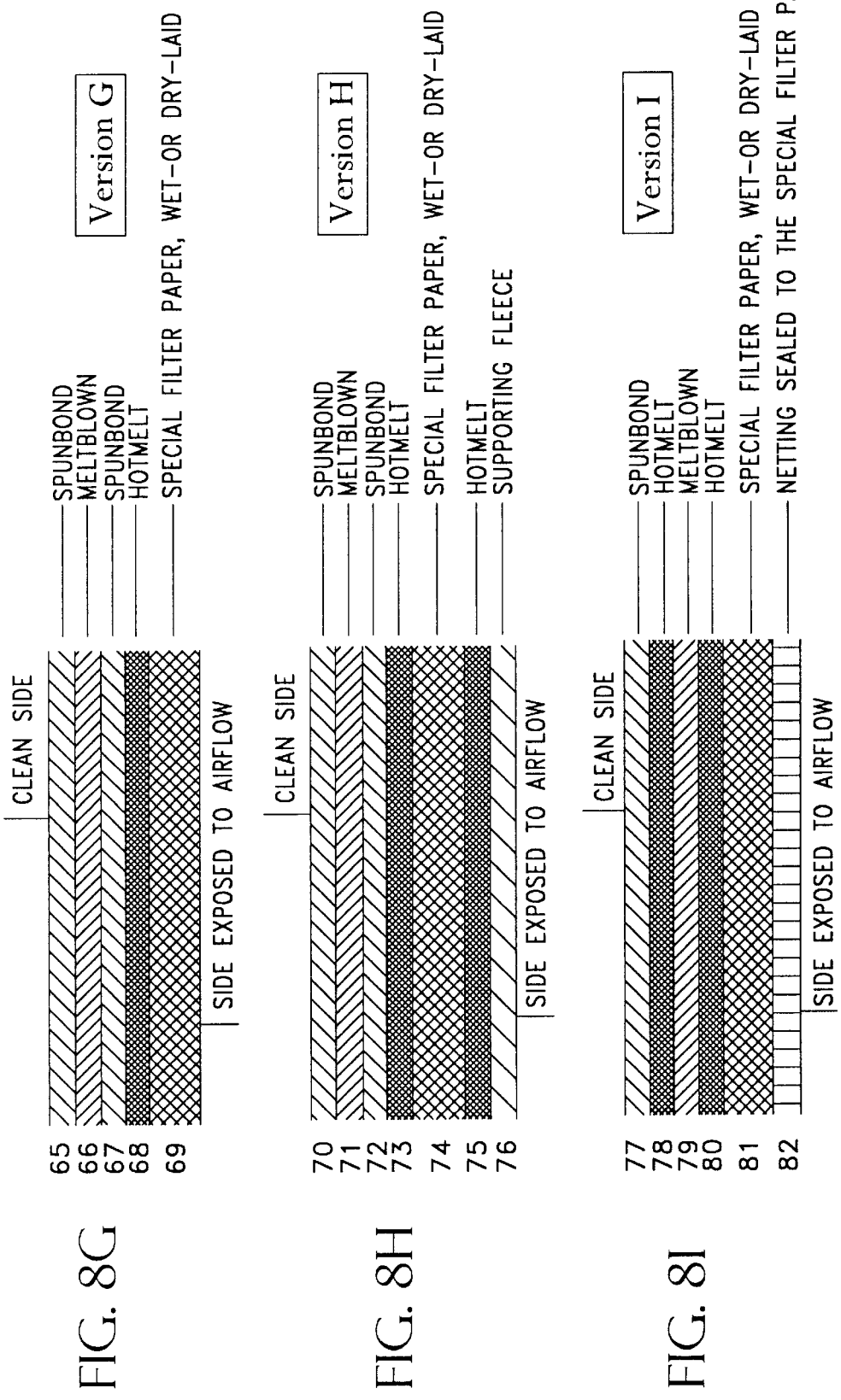
FIG. 8: NEW INVENTIVE VACUUM CLEANER BAG CONSTRUCTION WITH VERSIONS A–AA, IN WHICH THE SPECIAL FILTER PAPER IS ALWAYS IN FRONT OF THE MELTBLOWN FLEECE.

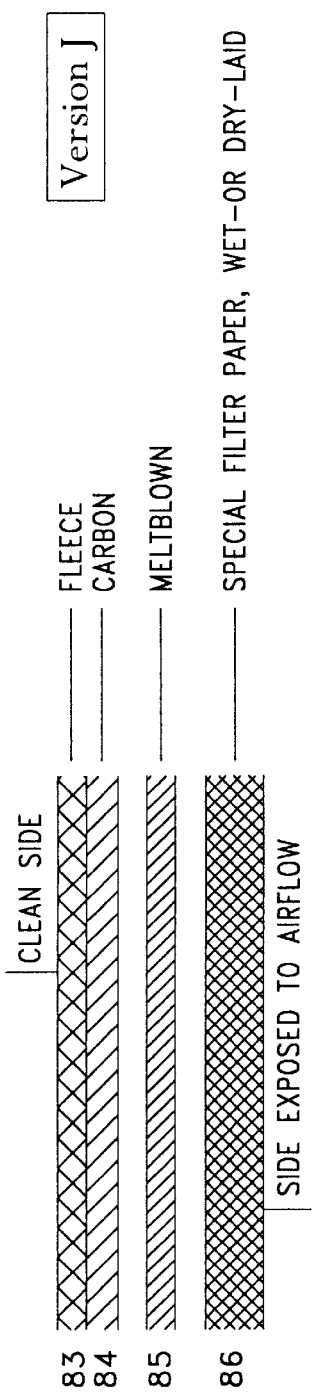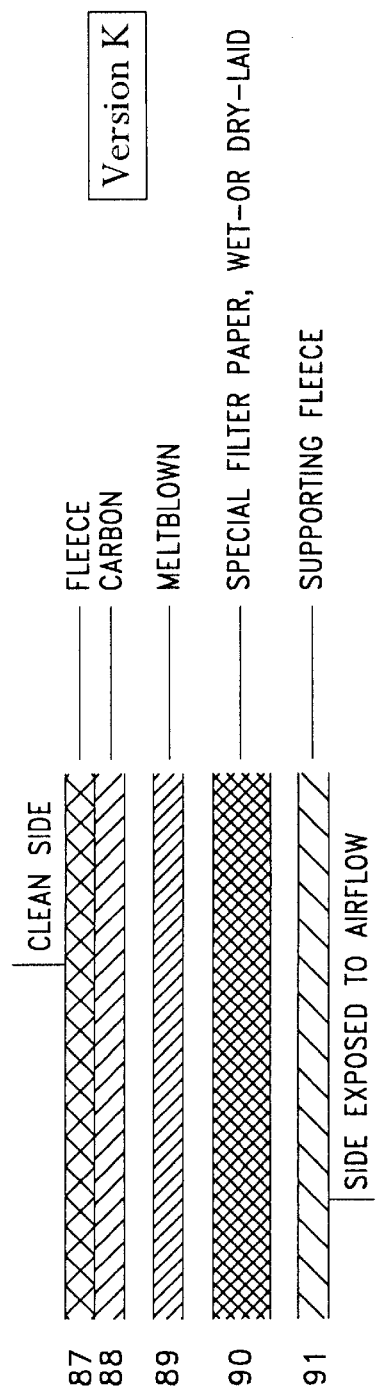
FIG. 8: NEW INVENTIVE VACUUM CLEANER BAG CONSTRUCTION WITH VERSIONS A–AA, IN WHICH THE SPECIAL FILTER PAPER IS ALWAYS IN FRONT OF THE MELTBLOWN FLEECE.

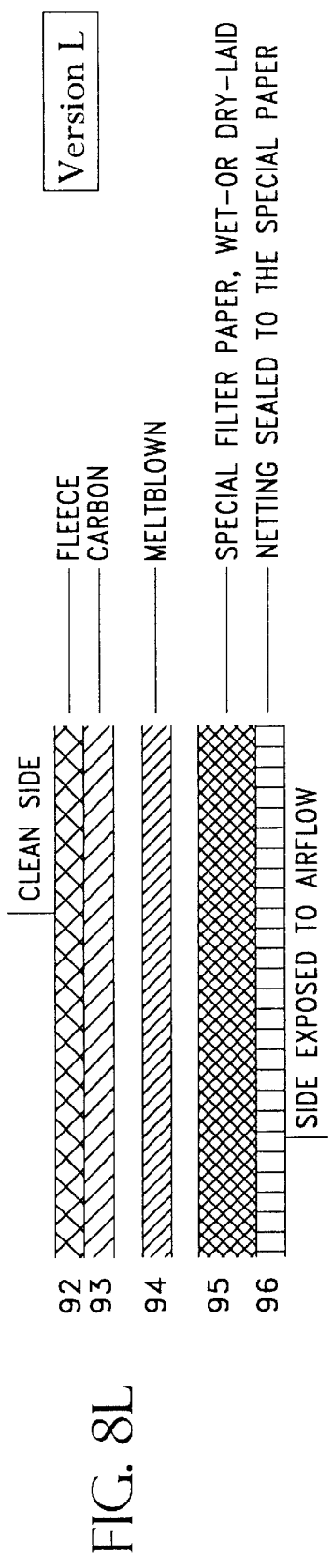
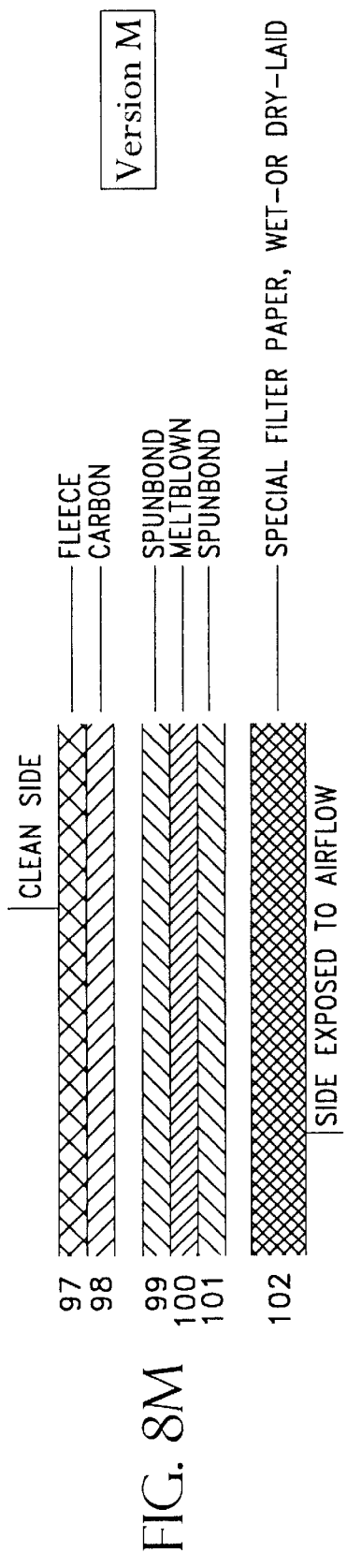
FIG. 8: NEW INVENTIVE VACUUM CLEANER BAG CONSTRUCTION WITH VERSIONS A–AA, IN WHICH THE SPECIAL FILTER PAPER IS ALWAYS IN FRONT OF THE MELTBLOWN FLEECE.

FIG. 8: NEW INVENTIVE VACUUM CLEANER BAG CONSTRUCTION WITH VERSIONS A–AA, IN WHICH THE SPECIAL FILTER PAPER IS ALWAYS IN FRONT OF THE MELTBLOWN FLEECE.

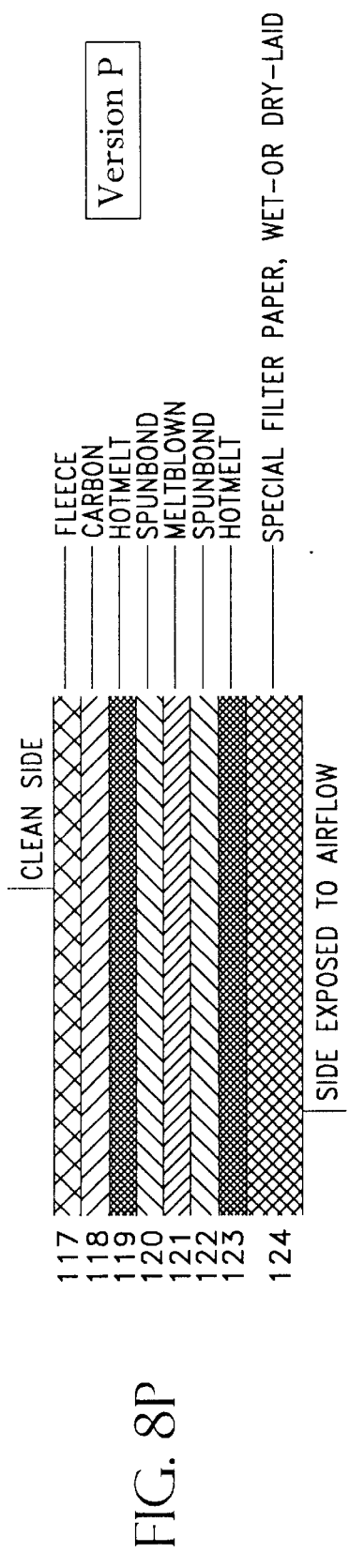
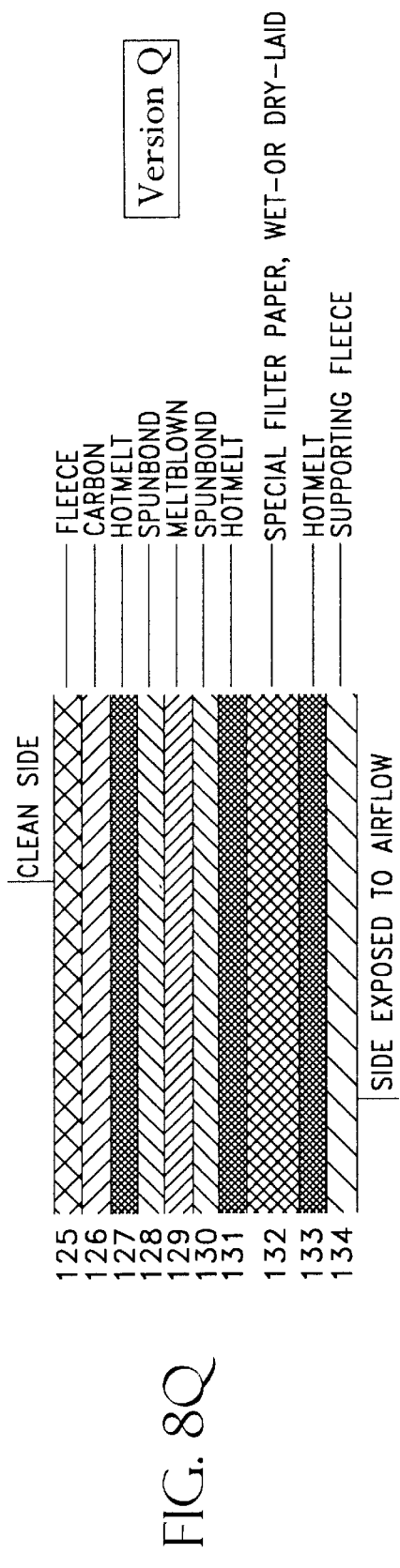
FIG. 8: NEW INVENTIVE VACUUM CLEANER BAG CONSTRUCTION WITH VERSIONS A-AA, IN WHICH THE SPECIAL FILTER PAPER IS ALWAYS IN FRONT OF THE MELTBLOWN FLEECE.
FIG. 8P
FIG. 8Q

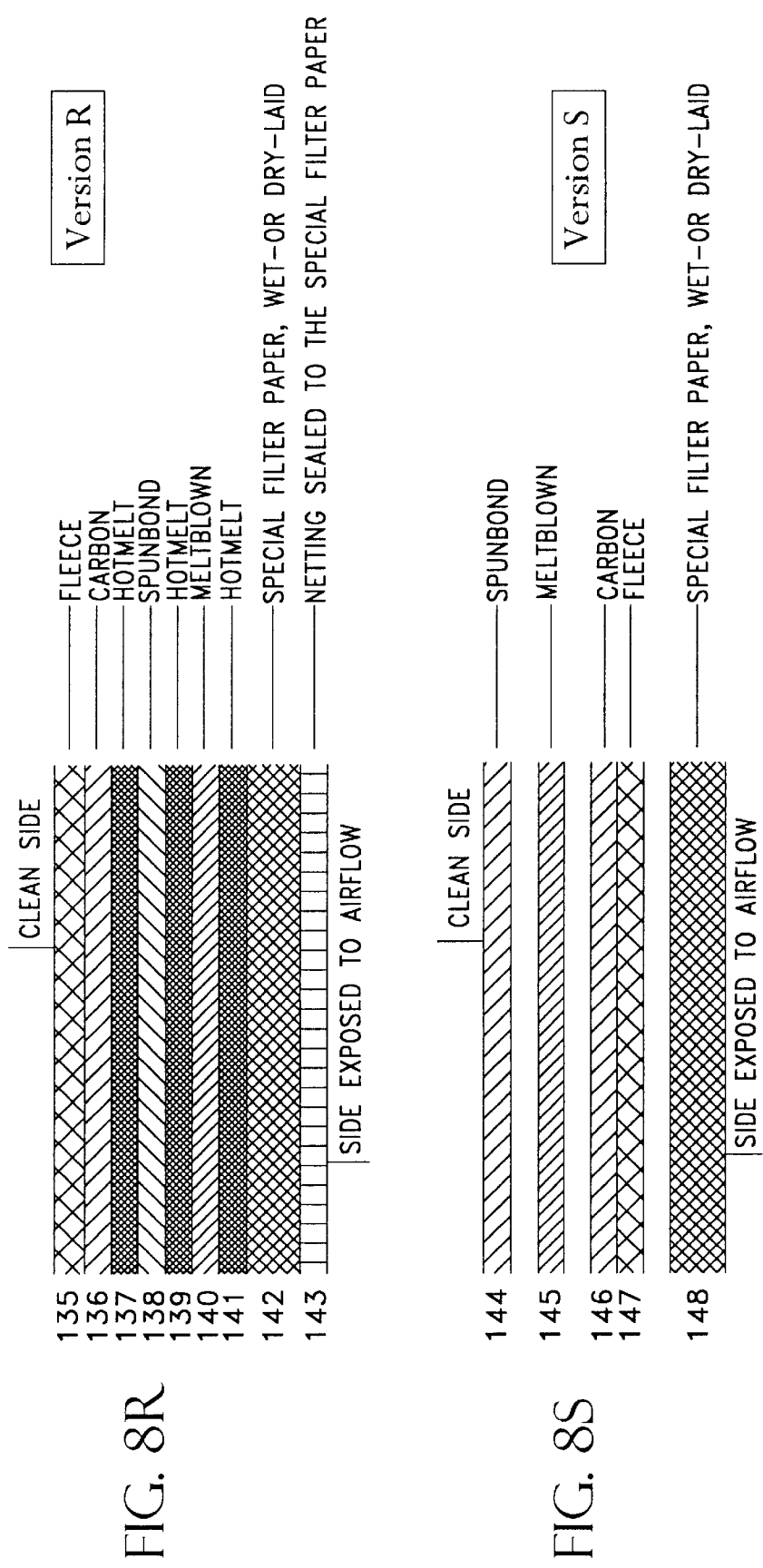
FIG. 8: NEW INVENTIVE VACUUM CLEANER BAG CONSTRUCTION WITH VERSIONS A-AA, IN WHICH THE SPECIAL FILTER PAPER IS ALWAYS IN FRONT OF THE MELTBLOWN FLEECE.

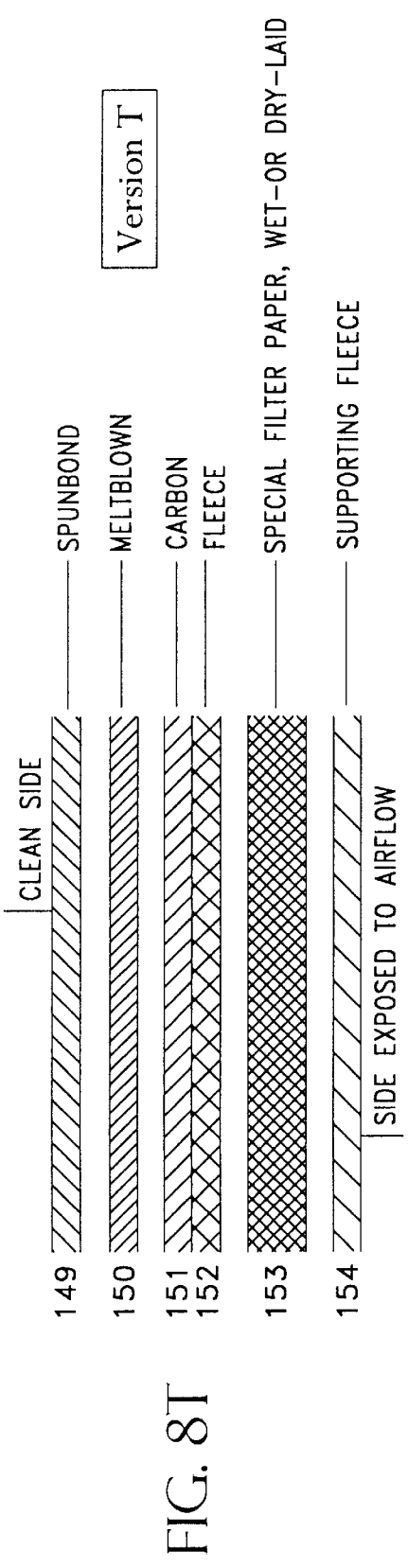
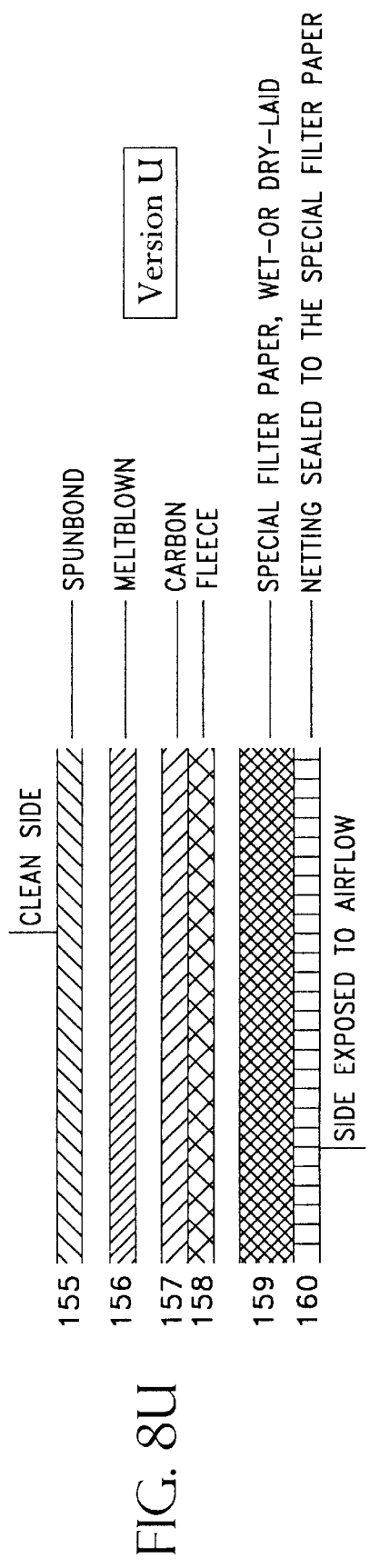
FIG. 8: NEW INVENTIVE VACUUM CLEANER BAG CONSTRUCTION WITH VERSIONS A–AA, IN WHICH THE SPECIAL FILTER PAPER IS ALWAYS IN FRONT OF THE MELTBLOWN FLEECE.

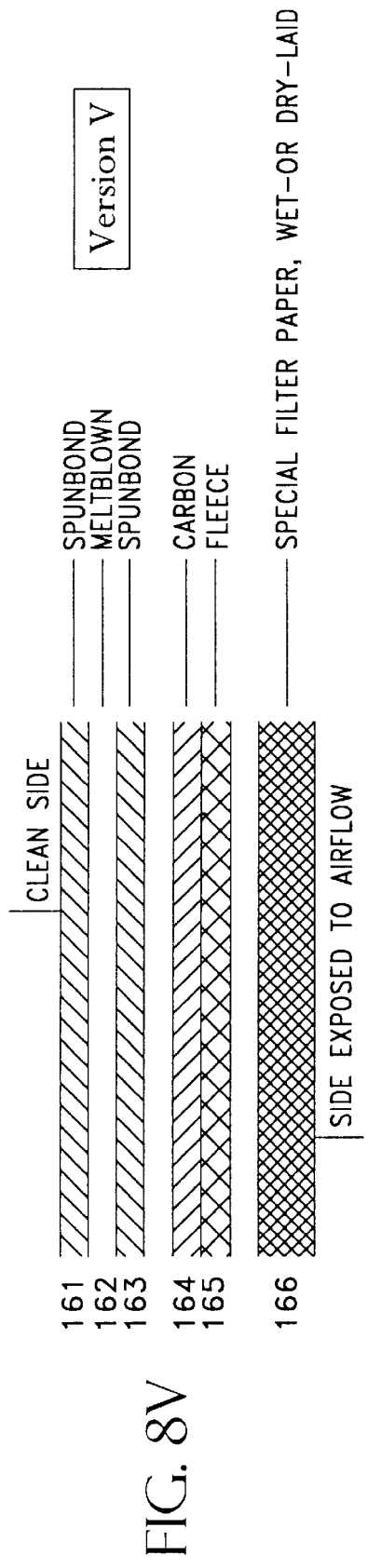
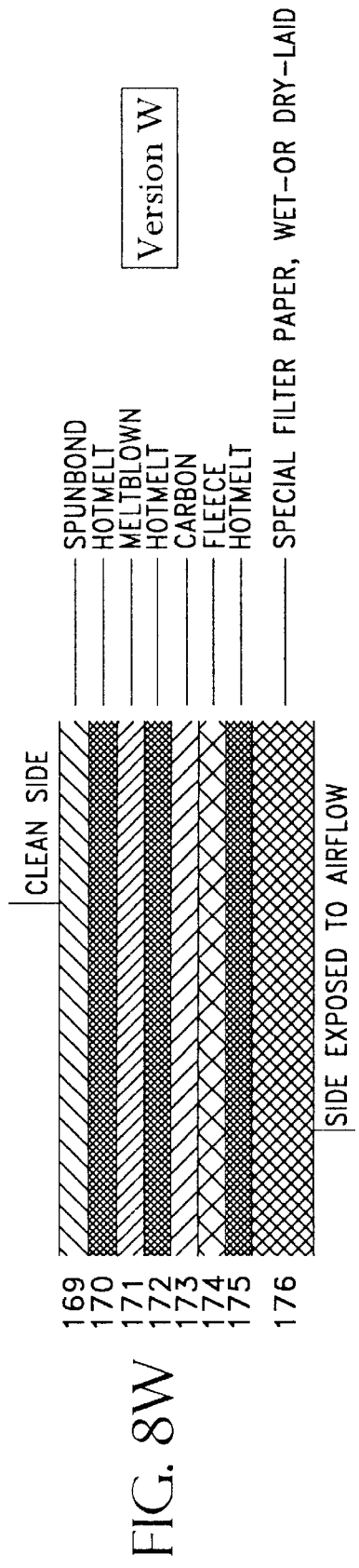
FIG. 8: NEW INVENTIVE VACUUM CLEANER BAG CONSTRUCTION WITH VERSIONS A–AA, IN WHICH THE SPECIAL FILTER PAPER IS ALWAYS IN FRONT OF THE MELTBLOWN FLEECE.
FIG. 8V
FIG. 8W

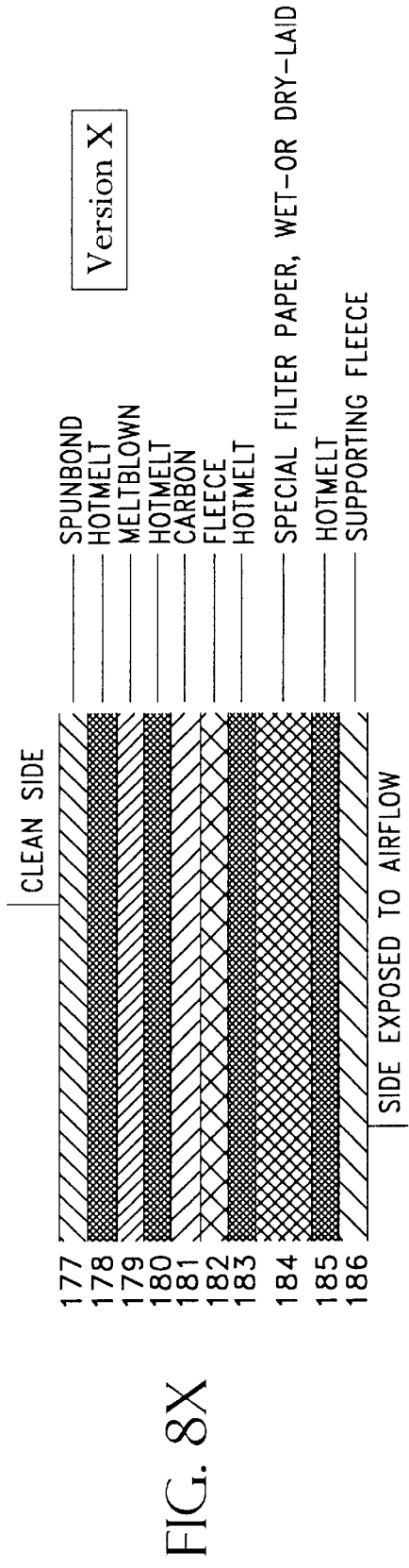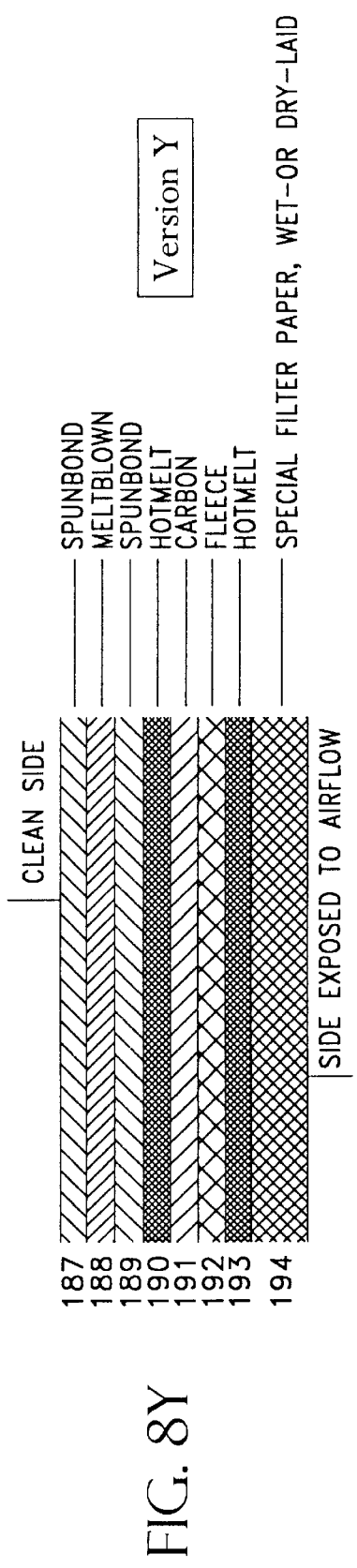
FIG. 8: NEW INVENTIVE VACUUM CLEANER BAG CONSTRUCTION WITH VERSIONS A–AA, IN WHICH THE SPECIAL FILTER PAPER IS ALWAYS IN FRONT OF THE MELTBLOWN FLEECE.
FIG. 8X
FIG. 8Y

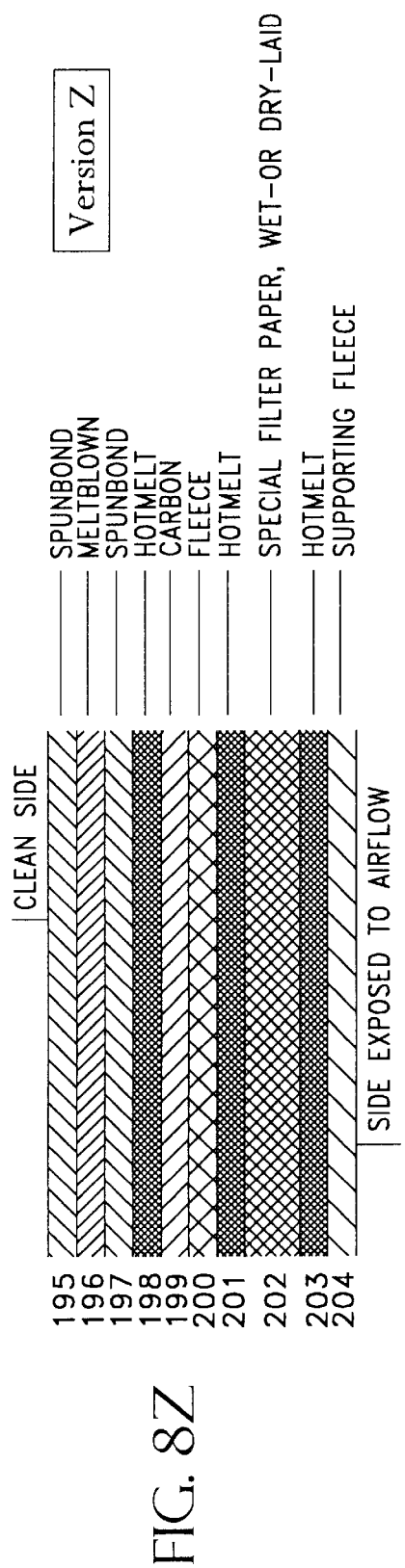
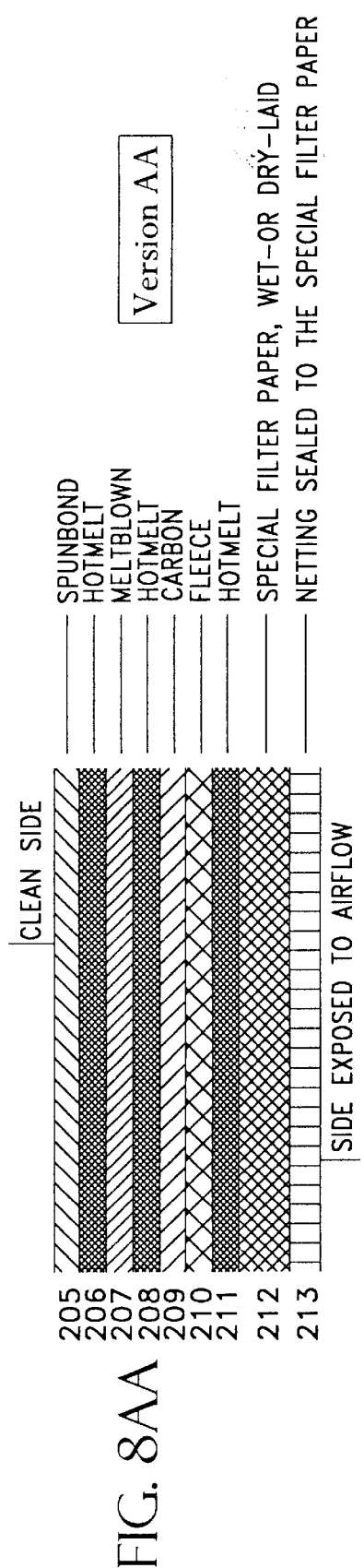
FIG. 8: NEW INVENTIVE VACUUM CLEANER BAG CONSTRUCTION WITH VERSIONS A–AA, IN WHICH THE SPECIAL FILTER PAPER IS ALWAYS IN FRONT OF THE MELTBLOWN FLEECE.
FIG. 8Z
FIG. 8AA

VACUUM CLEANER BAG CONSTRUCTION AND METHOD OF OPERATION

CROSS-REFERENCE TO PRIOR APPLICATIONS

This application claims priority of Provisional Application No. 60/085,032 filed May 11, 1998, Provisional Application Ser. No. 60/096,039 filed Aug. 11, 1998 and Provisional Application Ser. No. 60/106,143 filed Oct. 29, 1998, the full disclosures of these applications are fully incorporated herein by reference.

FIELD OF THE INVENTION

This invention relates to a novel disposable vacuum cleaner bag, composition which is notably superior to existing vacuum cleaner bag constructions in terms of dust holding capacity, minimal increase in pressure drop with dust loading, and in ease of bag fabrication and shape retention, while achieving filtration efficiency values which compare most favorably with premium commercially available bags.

BACKGROUND OF THE INVENTION

Over the last few years, a number of companies have developed raw materials and components for vacuum cleaner bags to replace the older single layer paper bag and the well-known two-ply bag, having a downstream filter paper and an upstream tissue paper, with bags having upstream layers of either wet-laid tissues or fibrous fleeces such as meltblown (MB) ultra-fine webs occasionally referred to herein as "filtration grade MB fleece." Some manufacturers of vacuum cleaners have even marketed bagless vacuum cleaners to avoid the cost of bags. However, this type of vacuum cleaner has less suction and the compartment holding the dust must be emptied manually, and this largely nullifies its advantages by exposing the worker and the environment to the concentrated dust. Nevertheless, the bagless cleaner has prompted manufacturers to continue to improve the overall performance of bags.

The prior art addressed the problem of providing a vacuum cleaner bag with improved filtration efficiency. U.S. Pat. No. 5,080,702, Home Care Industries, Inc. discloses a disposable filter container-like bag which comprises an assembly of juxtaposed plies, namely an inner and outer ply of air pervious material. U.S. Pat. No. 5,647,881 (EPO 0 822.775 B1) discloses a three layer composite of an outer support layer, middle charged fibrous filter layer having specific properties and an inner diffusion layer unbonded except at least at one seam to the fibrous filter layer. The diffusion layer is described to provide the filter bag as its main function, with resistance to shock loading. EPO 0 338 479 to Gessner discloses a dust filter bag with a fibrillated fleece-lined outer layer of filter paper. The filtration grade fibrillated fleece layer is upstream of the filter paper.

In the vacuum bag of the invention the principal function of the inner layer is that of high dust-holding capacity, a property of this magnitude not yet disclosed in the prior art.

The disclosures of the above-mentioned patents are incorporated herein in their entirety by reference.

With the advent of electrostatically charged MB fleeces, it has been possible to produce bag laminates with filtration efficiencies on the order of 99.8–99.9% to fine dust at a moderate airflow. However, conventional MB webs are essentially flat filters. Consequently, filter structures that utilize MB webs quickly load up with dust, reduce the air suction, and lose further dust pick up ability by the vacuum cleaner. Today, the standard dust bags have an air permeability of 200 to 400 L/(m$^2$×s). It is desirable to have a combination of paper types and other liners, including MB liners that would yield a high efficiency of up to 99.9% and also, am allow a high flow with minimal pressures gradient increase measured by the DIN 44956-2 Test.

A primary object of this invention is to provide a novel vacuum cleaner bag composition capable of extremely high filtration efficiency to fine dust and of maximum performance of a vacuum cleaner in terms of continuous high suction for picking up dust without a notable increase in pressure drop until the bag is filled.

A second objective of this invention is to provide a bag with a composition such that it has the rigidity needed for it to be fabricated and shaped on conventional vacuum cleaner bag making equipment.

A third objective of this invention is to construct a vacuum cleaner bag media that by virtue of its excellent filtration efficiency and superior non-blocking, high airflow performance, will be most suitable to the new European trend of small vacuum cleaners, with of course, smaller vacuum dust bags.

These and other objectives of this inventor will become apparent to one skilled in the art from the following disclosure.

The Nonwoven Fabrics Handbook of the Association of the Nonwoven Fabrics Industry, 1992, is incorporated herein in its entirety by reference.

SUMMARY OF THE INVENTION

A disposable vacuum cleaner bag that has an air permeability of greater than 400 L/(m$^2$×s) was developed. This was accomplished by placing a filter paper on the upstream air side of a filtration grade MB fleece/spunbond two-ply component, instead of placing a filter paper on the outside (i.e., downstream air side) of the bag, as is typically done. It should be noted, however, that prior art bag constructions often place a lightweight (typically 13 g/m$^2$) tissue fleece upstream of the MB fleece for support and to protect the MB fleece from abrasion. This lightweight tissue fleece only filters some of the largest dust particles.

In the new filter bag construction, it is possible to use a coarse filter paper ocassionally referred to herein as "high dust holding capacity," "multipurpose" or "capacity" paper or layer, on the most upstream layer inside the bag. This invention also allows for optional use of lightweight tissue fleece, netting or other scrim on the most inside layer upstream of the filter paper. Thus, large dust particles are removed by the coarse filter paper (and possibly to a minor extent by the light weight tissue fleece, if used). The filtration grade MB part of the bag fabric can serve more effectively as a filter without clogging up, since it does not need to hold the bulk of the dust. If desired, a wet-laid tissue may also be used in front of the coarse paper. This construction is very much unlike the earlier constructions that used MB liners on the inside of the bag, and which depended upon the MB web for both dust holding and filtration. Furthermore, the paper gives the bag the rigidity needed to fabricate and shape the novel bag composition on conventional vacuum cleaner bag making equipment.

The novel vacuum cleaner bag thus comprises a flat composite of a coarse filter layer comprising at least one of (a) a wet-laid high dust holding capacity paper, (b) a dry-laid high dust holding capacity paper, (c) a high bulk meltblown nonwoven, (d) a Spunblown (Modular) nonwoven, and (e) a microdenier spunbond nonwoven positioned upstream in the direction of air flow of a filtration grade meltblown fleece layer formed into the bag having at least one air inlet defining means in the flat composite and at least one seam forming the flat composite into the bag. The filter layer operative according to this invention which is positioned downstream of the course, capacity layer is sometimes referred to herein as a "secondary" or "high efficiency filtration" layer.

BRIEF DESCRIPTION OF THE DRAWINGS

FIG. 8A is a schematic cross-section of an embodiment of the vacuum cleaner bag construction according to this invention.

FIG. 8B is another schematic cross-section of an embodiment of the vacuum cleaner bag construction according to this invention.

FIG. 8C is another schematic cross-section of an embodiment of the vacuum cleaner bag construction according to this invention.

FIG. 8D is another schematic cross-section of an embodiment of the vacuum cleaner bag construction according to this invention.

FIG. 8E is another schematic cross-section of an embodiment of the vacuum cleaner bag construction according to this invention.

FIG. 8F is another schematic cross-section of an embodiment of the vacuum cleaner bag construction according to this invention.

FIG. 8G is another schematic cross-section of an embodiment of the vacuum cleaner bag construction according to this invention.

FIG. 8H is another schematic cross-section of an embodiment of the vacuum cleaner bag construction according to this invention.

FIG. 8I is another schematic cross-section of an embodiment of the vacuum cleaner bag construction according to this invention.

FIG. 8J is another schematic cross-section of an embodiment of the vacuum cleaner bag construction according to this invention.

FIG. 8K is another schematic cross-section of an embodiment of the vacuum cleaner bag construction according to this invention.

FIG. 8L is another schematic cross-section of an embodiment of the vacuum cleaner bag construction according to this invention.

FIG. 8M is another schematic cross-section of an embodiment of the vacuum cleaner bag construction according to this invention.

FIG. 8P is another schematic cross-section of an embodiment of the vacuum cleaner bag construction according to this invention.

FIG. 8Q is another schematic cross-section of an embodiment of the vacuum cleaner bag construction according to this invention.

FIG. 8R is another schematic cross-section of an embodiment of the vacuum cleaner bag construction according to this invention.

FIG. 8S is another schematic cross-section of an embodiment of the vacuum cleaner bag construction according to this invention.

FIG. 8T is another schematic cross-section of an embodiment of the vacuum cleaner bag construction according to this invention.

FIG. 8U is another schematic cross-section of an embodiment of the vacuum cleaner bag construction according to this invention.

FIG. 8V is another schematic cross-section of an embodiment of the vacuum cleaner bag construction according to this invention.

FIG. 8W is another schematic cross-section of an embodiment of the vacuum cleaner bag construction according to this invention.

FIG. 8X is another schematic cross-section of an embodiment of the vacuum cleaner bag construction according to this invention.

FIG. 8Y is another schematic cross-section of an embodiment of the vacuum cleaner bag construction according to this invention.

FIG. 8Z is another schematic cross-section of an embodiment of the vacuum cleaner bag construction according to this invention.

FIG. 8AA is another schematic cross-section of an embodiment of the vacuum cleaner bag construction according to this invention.

DETAILED DESCRIPTION

Figure 1:
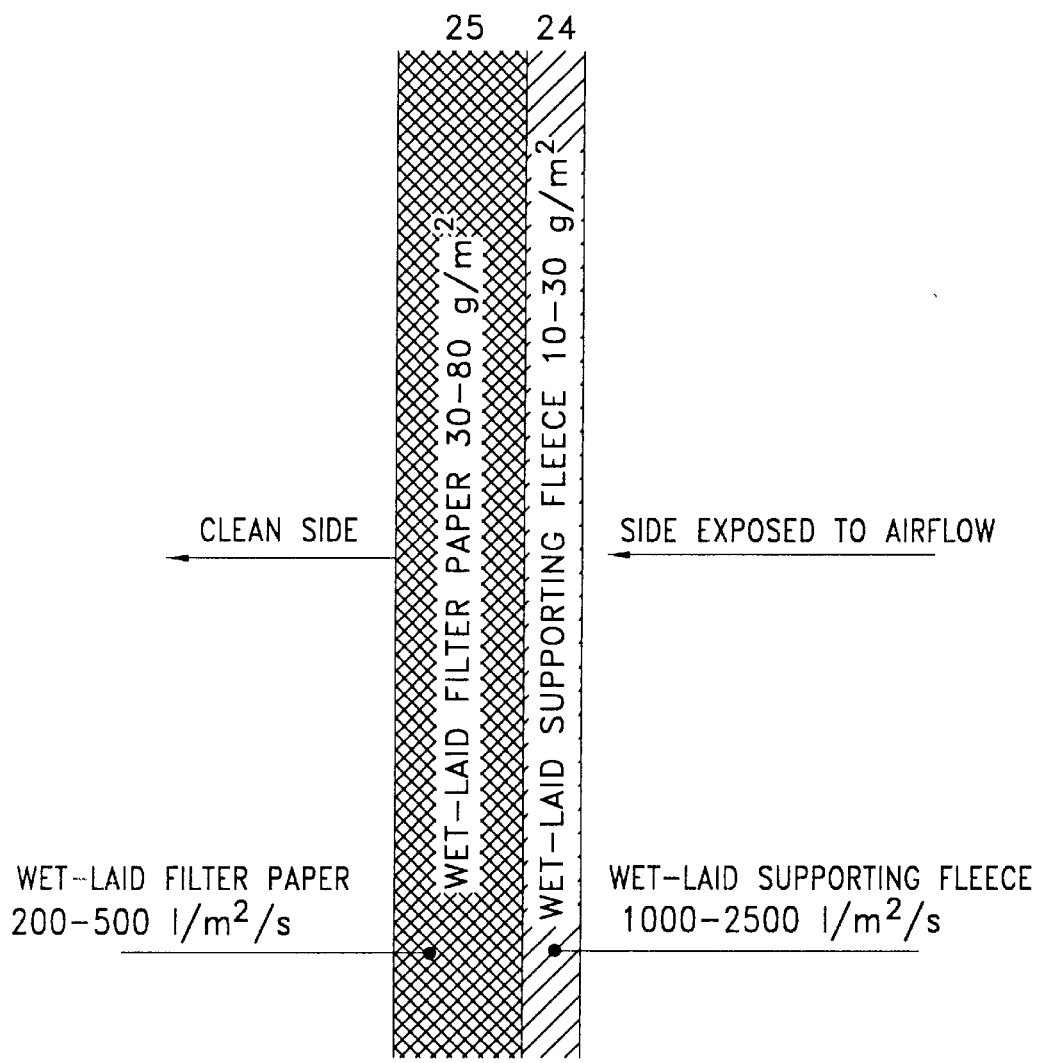
FIG. 1 is a schematic cross-section of a traditional vacuum cleaner bag construction consisting of wet-laid tissue (inside of bag) and filter paper (air outlet side).

The filter structures of this invention apply to vacuum cleaner bags, and more generally to vacuum filters. By "vacuum filter" is meant a filter structure intended to operate by passing a gas, preferably air, which entrains usually dry solid particles, through the structure. The convention has been adopted in this application to refer to the sides and layers of the structure in relation to the direction of air flow. That is, the filter inlet side is "upstream" and the filter discharge side is "downstream" for example. Occasionally herein the terms "in front of" and "behind" have been used to denote relative positions of structure layers as being upstream and downstream respectively. Of course, there will be a pressure gradient, sometimes referred to as "pressure drop", across the filter during filtration. Vacuum cleaners typically use bag shaped filters. Normally, the upstream side of a vacuum bag filter is the inside and the downstream side is outside.

DIN 44956-2: The DIN 44956-2 was employed to determine the increase in pressure drop of five different examples of vacuum cleaner bag constructions after dust loading with fine dust at the following levels: 0, 0.5, 1.0, 1.5, 2.0, and 2.5 grams.

Air Permeability after Fine Dust Loading Test: The dust loading, part of the DIN 44956-2 was performed at 0.5 gram increments from 0 to 2.5 g/m²/s on seven bags of each sample. However, the pressure drop values were not recorded again. The maximum sustainable air permeability values were then determined on the bags, which had the specified levels of dust loading.

Types of papers which are referred to in this patent application are described in greater detail as follows:
Standard Vacuum Cleaner Filter Bag Paper:

This type of paper has traditionally been used as a single ply in which it provides dust filtration and containment, as well as the strength and abrasion resistance required of a vacuum cleaner bag. This paper is also rigid enough to enable easy fabrication on standard bag manufacturing equipment. The paper is predominantly composed of unbleached wood pulp with 6–7% of a synthetic fiber such as poly[ethylene terephthalate] (PET) type polyester, and is produced by the wet laying process. The standard paper typically has a basis weight of about 30–80 g/m² and commonly about 50 g/m². The PET fibers typically have a fineness of 1.7 dtex and lengths of 6–10 mm. This paper has air permeability in the range of about 200–500 L/(m²×s) and an average pore size of about 30 $\mu$m. However, the efficiency as determined from the DIN 44956-2 Test is only about 86%. Another disadvantage is that the pores are quickly clogged with dust and the dust holding capacity is further limited by the very thin paper thickness of only about 0.20 mm.
Spunbond Nonwoven A nonwoven of spunbond polymer fibers can be deployed as a secondary filtration layer positioned downstream of the coarse layer. The fibers can be of any spunbond-capable polymer such as polyamides, polyesters or polyolefins. Basis weight of the spunbond nonwoven should be about 10–100 g/m² and preferably about 30–40 g/m². The spunbond nonwoven should have an air permeability of about 500–10,000 L/(m²×s), and preferably about 2,000–6,000 L/(m²×s) as measured by DIN 53887. The spunbond can also be electrostatically charged.
Scrim or Supporting Fleece Scrim refers to a generally light basis weight, very open porous paper or nonwoven web. Basis weight of the scrim is typically about 10–30 g/m², and frequently about 13–17 g/m². The scrim, sometimes referred to as a supporting fleece usually has air permeability of about 500–10,000 L/(m²×s). It is primarily employed to protect the high dust capacity multipurpose layer from abrasion. The scrim can also filter the very largest particles. The scrim, as well as any layer of the bag, can be electrostatically charged provided the material has suitable dielectric properties.
Wet-laid High Dust Capacity Paper:

Wet-laid High Dust Capacity Paper, frequently referred to herein as "wet-laid capacity paper" is bulkier, thicker and more permeable than the standard vacuum cleaner bag filter paper. In its role as a pre-filter in the vacuum cleaner bag composite it performs multiple functions. These include resisting shock loading, filtering of large dirt particles, filtering a significant portion of small dust particles, holding large amounts of particles while allowing air to flow through easily, thereby providing a low pressure drop at high particle loading which extends the life of the vacuum cleaner bag.

The wet-laid capacity paper usually comprises a fiber mixture of wood pulp fibers and synthetic fibers. It typically contains up to about 70% wood pulp and correspondingly more synthetic fiber, such as PET, than the standard paper described above. It has a greater thickness than the standard paper of about 0.32 mm at a typical basis weight of 50 g/m². Pore size also is much greater, in that the average pore size can be greater than 160 mm. Thus, the paper is able to hold much more dust in its pores before clogging up. Basis weight of the wet-laid capacity paper typically is about 30–150 g/m² and preferably about 50–80 g/m².

The wet-laid capacity paper has a fine dust particle filtration efficiency of about 66–67% as determined by the DIN 44956-2. Importantly, the wet-laid capacity paper has air permeability higher than the standard filter paper. The permeability lower limit thus preferably should be at least about 500 L/(m²×s), more preferably at least about 1,000 L/(m²×s) and most preferably at least about 2,000 L/(m²×s). The upper limit of permeability is defined to assure that the paper filters and holds a major fraction of the dust particles larger than about 10 mm. Consequently, the downstream secondary high efficiency filter medium is able to filter out and contain fine particles much longer before showing indication of a substantial pressure drop increase across the filter. Accordingly, the air permeability of the wet-laid capacity paper preferably should be at most about 8,000 L/(m²×s), more preferably at most about 5,000 L/(m²×s), and most preferably at most about 4,000 L/(m²×s). It is thus seen that the wet-laid capacity paper is especially well designed as a multipurpose filtration layer to be positioned upstream of the secondary high efficiency filtration layer.
Dry-laid High Dust Capacity Paper Prior to this invention, dry-laid high dust capacity paper, sometimes referred to herein as "dry-laid capacity paper", had not been used as a filter in vacuum cleaner bags. Dry-laid paper is not formed from a water slurry, but is produced with air-laying technology and preferably by a fluff pulp process. Hydrogen-bonding which plays a large roll in attracting the molecular chains together does not operate in the absence of water. Thus, at the same basis weight, dry-laid capacity paper, is usually much thicker than standard paper and the wet--laid capacity paper. For a typical weight of 70 g/m², the thickness is 0.90 mm, for example.

The dry-laid capacity paper webs can be bonded primarily by two methods. The first method is latex bonding in which the latex binder may be applied from water-based dispersions. Saturation techniques such as spraying or dipping and squeezing (padder roll application) followed in both cases by a drying and heat curing process can be used. The latex binder may also be applied in discrete patterns such as dots diamonds, cross hatches or wavy lines by gravure roll followed by drying and curing.

The second method is thermal bonding, for example by utilizing binder fibers. Binder fibers sometimes referred to herein as "thermally bondable fusing fibers" are defined by the *Nonwoven Fabric Handbook*, (1992 edition) as "Fibers with lower softening points than other fibers in the web. Upon the application of heat and pressure, these act as an adhesive." These thermally bondable fusing fibers generally completely melt at locations where sufficient heat and pressure are applied for the web, thereby adhering the matrix fibers together at their cross-over points. Examples include co-polyester polymers which when heated adhere a wide range of fibrous materials.

In a preferred embodiment thermal bonding can be accomplished by adding from at least 20% preferably up to 50% of a bicomponent ("B/C") polymer fiber to the dry-laid web. Examples of B/C fibers include fibers with a core of polypropylene ("PP") and a sheath of more heat sensitive polyethylene ("PE"). The term "heat sensitive" means that thermoplastic fibers soften and become sticky or heat fusible at a temperature of 3–5 degrees C below the melting point. The sheath polymer preferably should have a melting point in the range of about 90–160° C. and the core polymer should have a higher melting point, preferably by at least about 5° C. higher than that of the sheath polymer. For example, PE melts at 121° C. and PP melts at 161–163° C. This aids in bonding the dry-laid web when it passes between the nip of a thermal calendar or into a through-air oven by achieving thermally bonded fibers with less heat and pressure to produce a less compacted, more open and breathable structure. In a more preferred embodiment the core of the core/sheath of the B/C fiber is located eccentric of the sheath. The more that the core is located towards one side of the fiber the more likely that the B/C fiber will crimp during the thermal bonding step, and thereby increase the bulk of the dry-laid capacity. This will, of course, improve its dust holding capacity. Thus, in a still further preferred embodiment the core and sheath are located side-by-side in the B/C fiber, and bonding is achieved with a through-air oven. A thermal calendar, which would compress the web more than through-air bonding and is less preferred in this case. Other polymer combinations that may be used in core/sheath or side-by-side B/C fibers include PP with co-polyester low melting polymers, and polyester with nylon 6. The dry-laid high capacity layer can also be constituted essentially completely by bicomponent fibers.

Generally, the average pore size of dry-laid capacity is intermediate between the pore size of the standard paper and wet-laid capacity paper The filtration efficiency as determined by the DIN 44956-2 Test is approximately 80%. Dry-laid capacity paper should have about the same basis weight and the same permeability as the wet-laid capacity paper described above, i.e., in the range of about 500–8000 L/(m$^2$xs), preferably about 1000–5000 L/(m$^2$xs) and most preferably about 2000–4000 L/(m$^2$xs). It has excellent dust holding capacity and has the advantage of being much more uniform in weight and thickness than the wet-laid papers.

Several preferred embodiments of dry-laid capacity paper are contemplated. One is a latex bonded fluff pulp fiber composition. That is, the fibers comprising the paper consist essentially of fluff pulp. The term "fluff pulp" means a nonwoven component of the vacuum cleaner bag of this invention which is prepared by mechanically grinding rolls of pulp, i.e., fibrous material of wood, then aerodynamically transporting the pulp to web forming components of air laying or dry forming machines. A Wiley Mill can be used to grind the pulp. So-called Dan Web or M and J machines are useful for dry forming. A fluff pulp component and the dry-laid layers of fluff pulp are isotropic and are thus characterized by random fiber orientation in the direction of all three orthogonal dimensions. That is, they have a large portion of fibers oriented away from the plane of the nonwoven web, and particularly perpendicular to the plane, as compared to three-dimensionally anisotropic nonwoven webs. Fibers of fluff pulp utilized in this invention preferably are from about 0.5–5 mm long. The fibers are held together by a latex binder. The binder can be applied either as powder or emulsion. Binder is usually present in the dry-laid capacity paper in the range of about 10–30 wt % and preferably about 20–30 wt % binder solids based on weight of fibers.

Another preferred embodiment the dry-laid capacity paper comprises a thermally bonded blend of fluff pulp fibers and at least one of split film fibers and bicomponent polymer fibers. More preferably, the blend of fluff pulp fibers comprises fluff pulp fibers and bicomponent polymer fibers.

Split film fibers are essentially flat, rectangular fibers which may be electrostatically charged before or after being incorporated into the composite structure of the invention. The thickness of the split film fibers may range from 2–100 micrometers, the width may range from 5 micrometers to 2 millimeters, and the length may range from 0.5 to 15 mm. However, the preferred dimensions of the split film fibers are a thickness of about 5 to 20 $\mu$m, a width of about 15 to 60 $\mu$m, and a length of about 0.5 to 3 mm.

The split film fibers of the invention are preferably made of a polyolefin, such as polypropylene (PP). However, any polymer which is suitable for making fibers may be used for the split film fibers of the composite structures of the invention. Examples of suitable polymers include, but are not limited to, polyolefins like homopolymers and copolymers of polyethylene, polyterephthalates, such as poly (ethylene terephthalate) (PET), poly(butylene terephthalate) (PBT), poly(cyclohexyl-dimethylene terephthalate) (PCT), polycarbonate, and polychlorotrifluoroethylene (PCTFE). Other suitable polymers include nylons, polyamides, polystyrenes, poly-4-methylpentene-1, polymethylmethacrylates, polyurethanes, silicones, polyphenylene sulfides. The split film fibers may also comprise a mixture of homopolymers or copolymers. In the present application, the invention is exemplified with split film fibers made of polypropylene.

The use of PP polymers with various molecular weights and morphologies in laminate film structures has been shown to produce films with a proper balance of mechanical properties and brittleness required to produce split film fibers. These PP split film fibers may also be subsequently given the desired level of crimp. All dimensions of the split film fibers may, of course, be varied during manufacture of the fibers.

One method for production of the split fibers, is disclosed in U.S. Pat. No. 4,178,157, which is incorporated by reference. Polypropylene is melted and extruded into a film which is then blown into a large tube (balloon) into which ambient air is introduced or allowed to enter, in accordance with conventional blow stretching technology. Inflating the balloon with air serves to quench the film and to bi-axially orient the molecular structure of the PP molecular chains, resulting in greater strength. The balloon is then collapsed and the film is stretched between two or more pairs of rollers in which the film is held in the nip of two contacting rollers, with the application of varying amounts of pressure between the two contacting rollers. This results in an additional stretch in the machine direction which is accomplished by driving the second set of rollers at a faster surface speed than the first set. The result is an even greater molecular orientation to the film in the machine direction which will subsequently become the long dimension of the split film fibers.

The film may be electrostatically charged before or after it has been cooled down. Although various electrostatic charging techniques may be employed to charge the film, two methods have been found to be most preferable. The first method involves passing the film about midway in a gap of about 1.5 to 3 inches between two DC corona electrodes. Corona bars with emitter pins of metallic wire may be used in which one corona electrode has a positive DC voltage potential of about 20 to 30 kV and the opposing electrode has a negative DC voltage of about 20 to 30 kV.

The second, preferred, method utilizes the electrostatic charging technologies described in U.S. Pat. No. 5,401,446 (Wadsworth and Tsai, 1995), which is referred to as Tantret. TM. Technique I and Technique II, which are further described herein. It has been found that Technique II, in which the film is suspended on insulated rollers as the film passes around the inside circumference of two negatively charged metal shells with a positive corona wire of each shell, imparts the highest voltage potentials to the films. Generally, with Technique II, positive 1000 to 3000 volts or more may be imparted to on one side of the films with similar magnitudes of negative volts on the other side of the charged film.

Technique I, wherein films contact a metal roller with a DC voltage of −1 to −10 kV and a wire having a DC voltage of +20 to +40 kV is placed from about 1 to 2 inches above the negatively biased roller with each side of the film being exposed in succession to this roller/wire charging configuration, results in lower voltage potentials as measured on the surfaces of the films. With Technique I, voltages of 300 to 1500 volts on the film surface with generally equal but opposite polarities on each side are typically obtained. The higher surface potentials obtained by Technique II, however, have not been found to result in better measurable filtration efficiencies of the webs made from the split film fibers. Therefore, and because it is easier to lace up and pass the film through the Technique I device, this method is now predominately used to charge the films prior to the splitting process.

The cooled and stretched film may be hot or cold electrostatically charged. The film is then simultaneously stretched and split to narrow widths, typically up to about 50 $\mu$m. The split, flat filaments are then gathered into a tow which is crimped in a controlled numbers of crimps per centimeter and then cut into the desired staple length.

In a particularly preferred embodiment, the dry-laid high dust capacity paper comprises a blend of all of fluff pulp fibers, bicomponent polymer fibers, and electrostatically charged split film fibers. Preferably, the fluff pulp fibers will be present at about 5–85 wt %, more preferably about 10–70 wt %, and most preferably about 40 wt %, the bicomponent fibers at about 10–60 wt %, more preferably about 10–30 wt % and most preferably about 20 wt %, and the electrostatically charged split film fibers at about 20–80 wt %, and more preferably about 40 wt %. This dry-laid high dust capacity may be thermally bonded, preferably at a high temperature of 90–160° C., more preferably, at a temperature lower than 110° C. and most preferably at about 90° C.

Other preferred embodiments of the dry-laid capacity paper comprises a thermally bonded paper with 100% "mixed electrostatic fibers", a blend of 20–80% mixed electrostatic fibers and 20–80% B/C fibers, and a blend of 20–80% mixed electrostatic fibers, 10–70% fluff pulp and 10–70% B/C fibers. "Mixed electrostatic fiber" filters are made by blending fibers with widely different tribolelectric properties and rubbing them against each other or against the metal parts of machines, such as wires on carding cylinders during carding. This makes one of the types of fibers more positively or negatively charged with respect to the other type of fiber, and enhances the coulombic attraction for dust particles. The production of filters with these types of mixed electrostatic fibers is taught in U.S. Pat. No. 5,470,485 and European Patent Application No. EP 02 246 811 A2.

In U.S. Pat. No. 5,470,485, the filter material consists of a blend of (I) polyolefin fibers and (II) polyacrylonitrile fibers. The fibers (I) are bicomponent PP/PE fibers of the core/sheath or side-by-side type. The fibers II are "halogen free". The (I) fibers also have some "halogen-substituted polyolefins": whereas, the acrylonitrile fibers have no halogen. The patent notes that the fibers must be thoroughly washed with nonionic detergent, with alkali, or solvent and then well rinsed before being mixed together so that they do not have any lubricants or anti-static agents. Although the patent teaches that the fiber mat produced should be needle punched, these fibers could also be cut to lengths of 5–20 mm and mixed with similar length bicomponent thermal binder fibers and also with the possible addition of fluff pulp so that dry-laid thermally bonded paper can be utilized in this invention.

EP 0 246 811 describes the triboelectric effect of rubbing two different types of fibers together. It teaches using similar types of fibers as U.S. Pat. No. 5,470,485, except that the —CN groups of the polyacrylonitrile fibers may be substituted by halogen (preferably fluorine or chlorine). After a sufficient amount of substitution of —CN by —Cl groups, the fiber may be referred to as a "modacrylic" if the copolymer comprises from 35 to 85% weight percent acrylonitrile units. EP 0 246 811 teaches that the ratio of polyolefin to substituted acrylonitrile (preferably modacrylic) may range from 30:70 to 80:20 by surface area, and more preferably from 40:60 to 70:30. Similarly, U.S. Pat. No. 5,470,485 teaches that the ratio of polyolefin to polyacrylonitrile fibers is in the range of 30:70 to 80:20, relative to a surface of the filter material. Thus, these ranges of ratios of polyolefin to acrylic or modacrylic fibers may be used in the above stated proportions in the dry-laid thermally bonded capacity paper.

High Bulk Meltblown Nonwoven

Another discovery from this research to develop improved vacuum cleaner bags was the development of a high bulk MB web which could be used upstream of the filtration grade MB fleece as a pre-filter in place of the wet-laid capacity paper or dry-laid capacity paper. The high bulk MB pre-filter can be made in a meltblowing process using chilled quench air with a temperature of about 10° C. In contrast, conventional MB normally uses room air at an ambient temperature of 35–45° C. Also the collecting distance from the MB die exit to the web take-up conveyer is increased to 400–600 mm in the high bulk MB process. The distance normally is about 200 mm for regular MB production. Additionally, high bulk MB nonwoven is made by using a lower temperature attenuation air temperature of about 215–235° C. instead of the normal attenuation air temperature of 280–290° C., and a lower MB melt temperature of about 200–225° C. compared to 260–280° C. for filtration grade MB production. The colder quench air, lower attenuation air temperature, lower melt temperature and the longer collecting distance cool down the MB filaments more. Removing heat results in less draw down of the filaments, and hence, in larger fiber diameters than would be found in typical filtration grade MB webs. The cooler filaments are much less likely to thermally fuse together when deposited onto the collector. Thus, the High Bulk Meltblown nonwoven would have more open area. Even with a basis weight of 120 g/m$^2$, the air permeability of the High Bulk Meltblown nonwoven is 806 L/(m$^2$×s). By contrast, a much lighter (e.g., 22 g/m$^2$) filtration grade MB PP web had a maximum air permeability of only 450 L/(m$^2$×s). The filtration efficiency of the High Bulk MB nonwoven as determined by the DIN 44956-2 Test was 98%. When the two were put together with the High Bulk MB nonwoven on the inside of the bag, the air permeability was still 295 L/(m$^2$×s), and the filtration efficiency of the pair was 99.8%. The high bulk meltblown nonwoven can be uncharged, or optionally electrostatically charged provided that the nonwoven is of material having suitable dielectric properties.

High Bulk MB nonwoven of this invention should be distinguished from "filtration grade MB" which also is employed in the multilayer vacuum filter structure of this disclosure. Filtration grade MB web is a conventional meltblown nonwoven generally characterized by a low basis weight typically of about 22 g/m$^2$, and a small pore size. Additional typical characteristics of filtration grade MB nonwoven of polypropylene are shown in Table I. A preferred high bulk MB nonwoven of polypropylene optimally includes about 5–20 wt % ethylene vinyl acetate. Filtration grade MB nonwoven has generally high dust removal efficiency, i.e., greater than about 99%.

TABLE I

|  | Preferred | More Preferred | Most Preferred |
|---|---|---|---|
| Filtration Grade MB PP |  |  |  |
| Weight g/m$^2$ | 5–150 | 10–50 | 22 |
| Thickness, mm | 0.10–2 | 0.10–1 | 0.26 |
| Air Permeability, L/(m$^2$ × s) | 100–1500 | 200–800 | 450 |
| Tensile Strength, MD, N | 0.5–15 | 1.0–10 | 3.7 |
| Tensile Strength, CD, N | 0.5–15 | 1.0–10 | 3.2 |
| Fiber Diameter, μm | 1–15 | 1–5 | 2–3 |
| High Bulk MB PP |  |  |  |
| Weight, g/m$^2$ | 30–180 | 60–120 | 80 |
| Thickness, mm | 0.3–3 | 0.5–2 | 1.4 |
| Air permeability, L/(m$^2$ × s) | 300–8000 | 600–3000 | 2000 |
| Tensile Strength, MD, N | 1.0–30 | 2–20 | 10 |
| Tensile Strength, CD, N | 1.0–30 | 2–20 | 9.2 |
| Fiber Diameter, μm | 5–20 | 10–15 | 10–12 |

High Bulk MB nonwoven is similar in filter efficiency to dry-laid and wet-laid capacity papers mentioned above. Thus, High Bulk MB nonwoven is well-adapted to remove large quantities of large dust particles and to hold large amounts of dust. Accordingly, High Bulk MB nonwoven is suited for placement upstream of, and as a pre-filter for, the filtration grade MB web in a vacuum filter structure of this invention.

Spunblown (Modular) Nonwoven

A new type of meltblowing technology described in Ward, G., Nonwovens World, Summer 1998, pp. 37–40, the complete disclosure of which is incorporated herein by reference, is available to produce a Spunblown (Modular) Nonwoven suitable for use as the coarse filter layer in the present invention. Optionally, the Spunblown Nonwoven can be utilized as the filtration grade meltblown fleece layer as called for in the novel vacuum cleaner bag structure. Specifications of the Spunblown (Modular) Nonwoven are presented in Table II.

The process for making the Spunblown (Modular) Nonwoven is generally a meltblown procedure with a more rugged modular die and using colder attenuation air. These conditions produce a coarse meltblown web with higher strength and air permeability at comparable basis weight of conventional meltblown webs.

Microdenier Spunbond Nonwoven

A spunbond ("SB") nonwoven, occasionally referred to herein as microdenier spunbond can also be utilized in this invention as the coarse filter layer or the filtration grade meltblown fleece layer. Specifications of microdenier spunbond are listed in Table II. Microdenier spunbond is particularly characterized by filaments of less than 12 μm diameter which corresponds to 0.10 denier for polypropylene. In comparison, conventional SB webs for disposables typically have filament diameters which average 20 μm. Microdenier spunbond can be obtained from Reifenhauser GmbH (Reicofil III), Koby Steel, Ltd., (Kobe-Kodoshi Spunbond Technology) and Ason Engineering, Inc. (Ason Spunbond Technology).

TABLE II

|  | Preferred | More Preferred | Most Preferred |
|---|---|---|---|
| Spunblown (Modular) |  |  |  |
| Weight g/m$^2$ | 20–150 | 20–80 | 40 |
| Thickness, mm | 0.20–2 | 0.20–1.5 | 0.79 |
| Air permeability, L/(m$^2$ × s) | 200–4000 | 300–3000 | 2000 |
| Tensile Strength, MD, N | 10–60 | 15–40 | — |
| Tensile Strength, CD, N | 10–50 | 12–30 | — |
| Fiber Diameter, μm | 0.6–20 | 2–10 | 2–4 |
| microdenier spunbond PP (Ason, Kobe-Kodoshi, Reicofil III) |  |  |  |
| Weight, g/m$^2$ | 20–150 | 20–80 | 40 |
| Thickness, mm | 0.10–0.6 | 0.15–0.5 | 0.25 |
| Air permeability, L/(m$^2$ × s) | 500–10,000 | 2000–6000 | 3000 |
| Tensile Strength, MD, N | 10–100 | 20–80 | 50 |
| Tensile Strength, CD, N | 10–80 | 10–60 | 40 |
| Fiber Diameter, μm | 4–18 | 6–12 | 10 |

Figure 2:
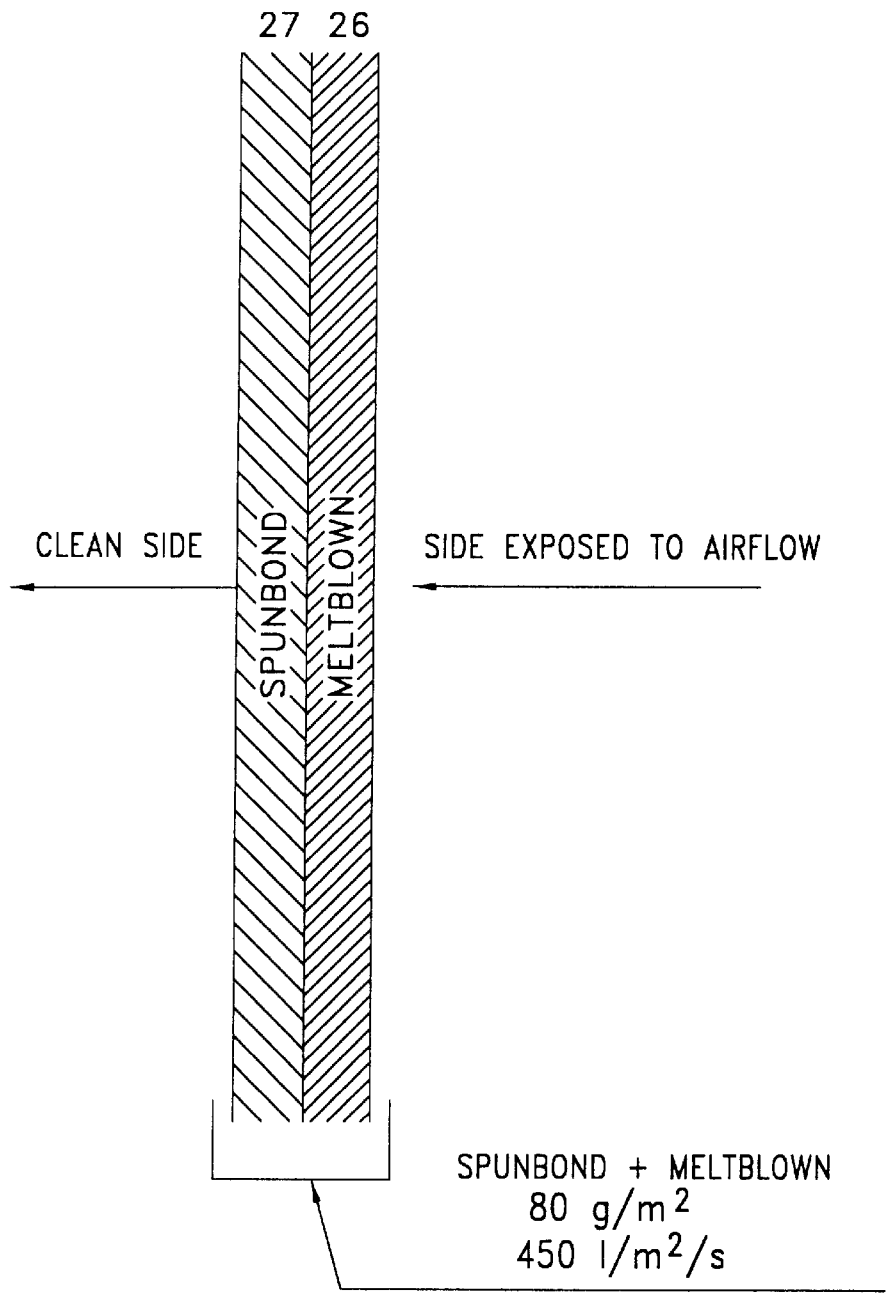
FIG. 2 is a schematic cross-section of a two-layer vacuum cleaner bag in which MB ultra-fine fiber fleece inside of bag serves as both the dust holding and filtering components.
Figure 3:
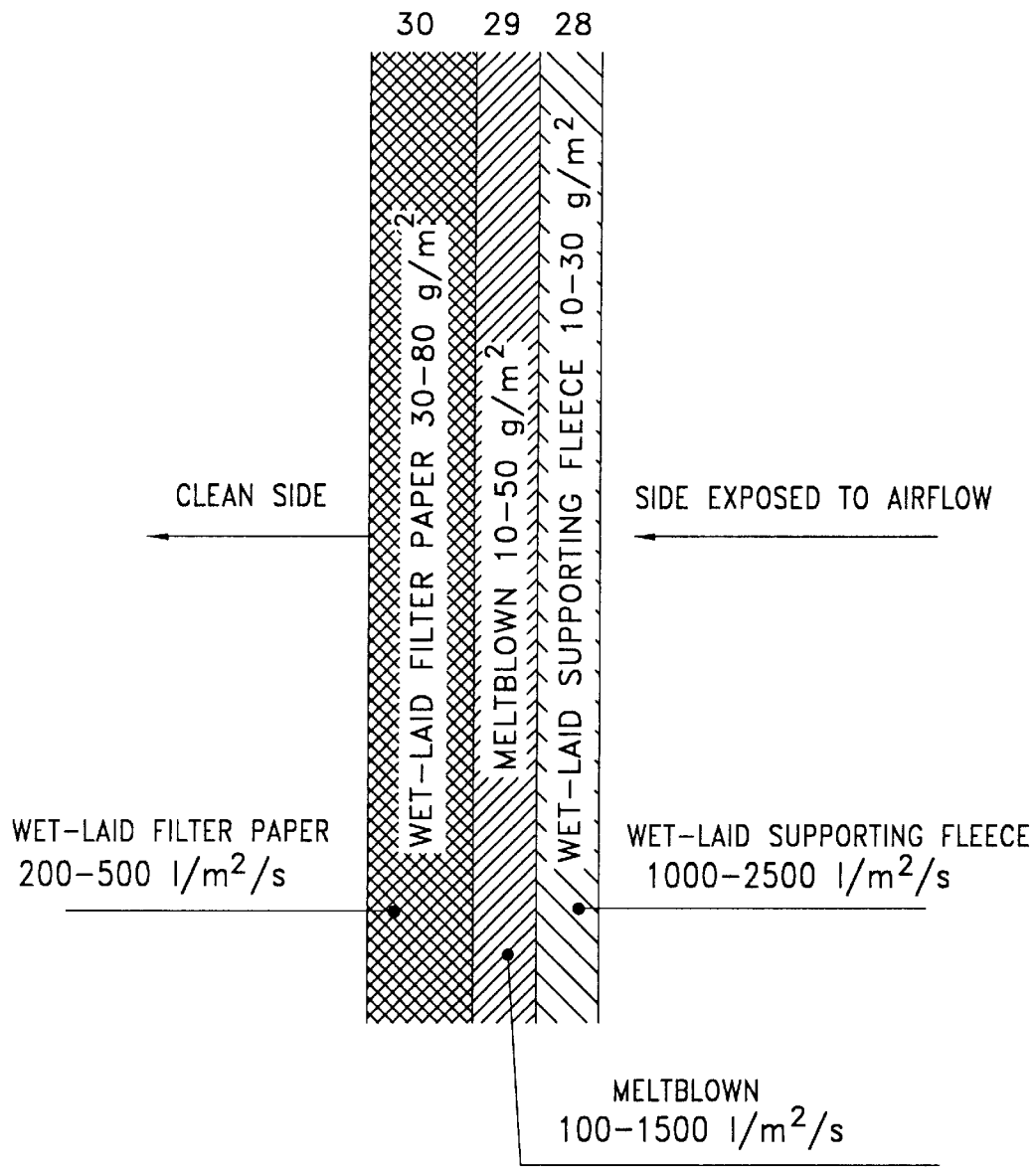
FIG. 3 is a schematic cross-section of a three-layer vacuum cleaner bag in which a wet-laid tissue fleece with very little dust holding capacity is added to protect the MB fleece from abrasion.

Referring now to the drawings and figures, FIG. 1 through FIG. 3 represent existing commercial vacuum cleaner bag constructions. FIG. 1 depicts a traditional structure consisting of wet-laid tissue fleece 24 on the inside (upstream side) of the bag and filter paper 25 on the outside (downstream side) of the bag. The tissue fleece serves as a pre-filter, removing only the largest dust particles. The filter paper typically filters out and holds in its porous structure particles greater than 10–20/μm.

FIG. 2 depicts a two-layer vacuum cleaner bag construction in which a meltblown (MB) fleece 26 serves as both a pre-filter, coarse filter, and fine filter by removing particles below 5 μm in diameter. However MB fleeces have much smaller pores than typical vacuum cleaner filter paper and can not hold dust as effectively. Furthermore, the MB fleece is often electrostatically charged to enhance filtration efficiency. When the MB fibers become covered with dust, the electrostatic field may be largely diminished. The prior art utilizing this design is European Patent Application number 89312886.8, Publication numbers 0 375 234 B1 and 0 375 234 A1. The spunbond (SB) layer 27 primarily provides support for the MB fleece, and improves the abrasion resistance of the outside of the bag. Other similar prior art includes U.S. Pat. No. 4,589,894 (3M) and European Patent Application Number 85302485.9 (Publication Number 0 161 790) assigned to 3M. In the U.S. Pat. No. 4,589,894 patent, and European Patent Application Number 85302485.9, a SB layer is also used on the inside of the bag and serves to further support and protect the MB fleece.

FIG. 3 depicts a three-layer vacuum cleaner bag construction in which the wet-laid supporting fleece 28 is added to serve as a pre-filter for only very large particles of dust and to protect the MB fleece from abrasion. The MB fleece 29 serves to filter- small and large particles and thus has a tendency to clog up very quickly, and thereby increases in pressure drop more Who quickly than traditional filter paper. The outside layer of filter paper 30 is in effect redundant for filtration and serves primarily to support the top surface of MB fleece, to strengthen the bag and to improve abrasion resistance of the outside surface of the bag. Examples of prior art depicting similar designs include European Patent Application Number 89106343.9 (Gessner) and U.S. Pat. No. 5,080,702 (Home Care Industries), discussed above. In the latter no tissue fleece interlining was used.

Figure 4:
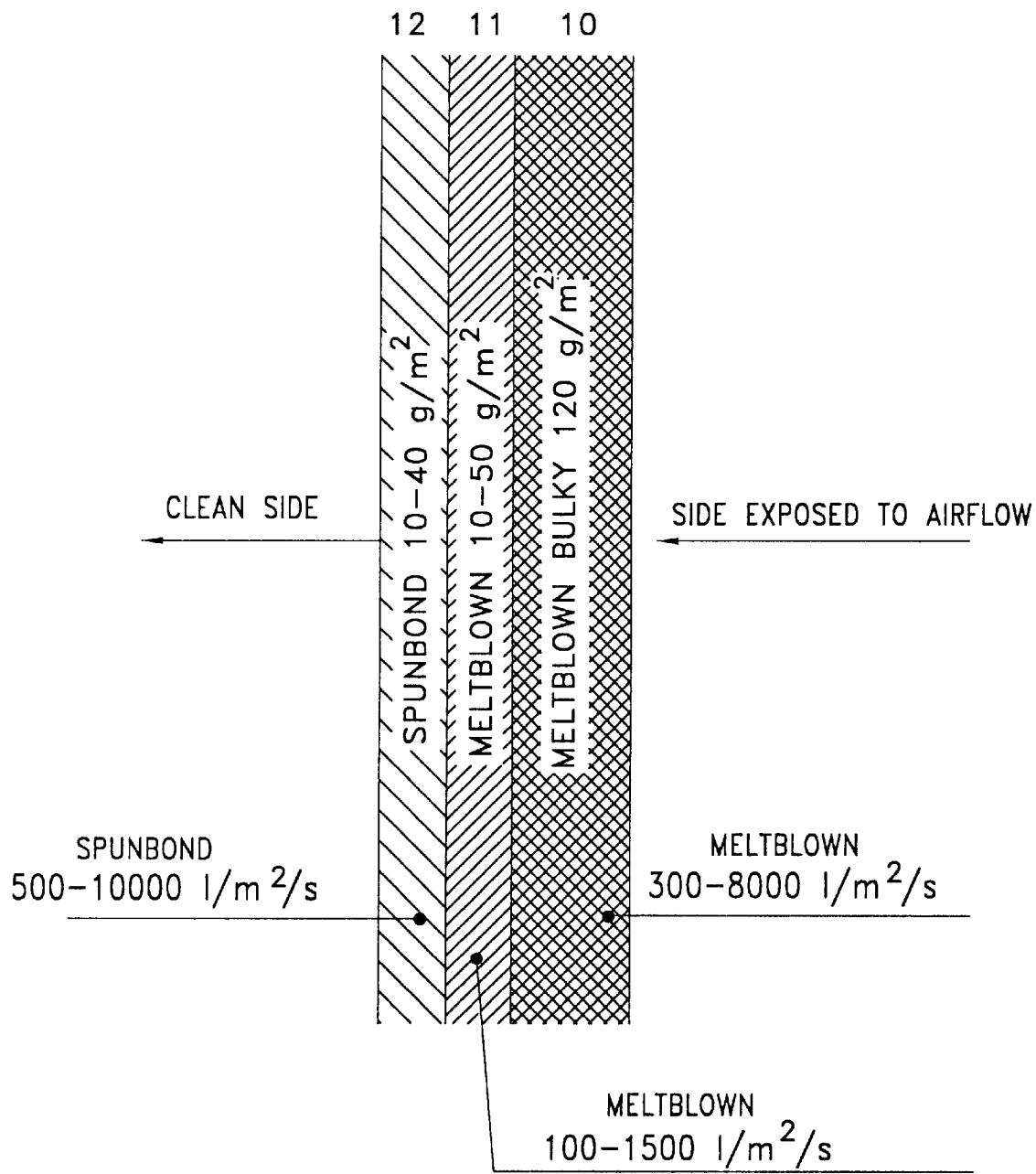
FIG. 4 is a schematic cross-section of a three-layer vacuum cleaner bag construction according to this invention in which a special bulky MB is placed in front of a filtration grade MB fleece and the spunbond layer is placed on the outside of the bag.

FIG. 4 depicts the new three-layer vacuum filter structure in which a wet-laid capacity paper, dry-laid capacity paper, or other suitable type of nonwoven coarse filter is placed upstream of a filtration grade MB fleece 11. This upstream layer serves to remove larger dust particles and to hold the dust in its structure. This layer should preferably have a much less dense, bulkier structure that is capable of holding a large quantity of dust without increasing the pressure drop. A high bulk MB nonwoven is shown in the figure as web 10. It is preferable that the inner MB web be loftier and more open than web 11 so that it can also contain more dust without pressure drop increase.

Figure 5:
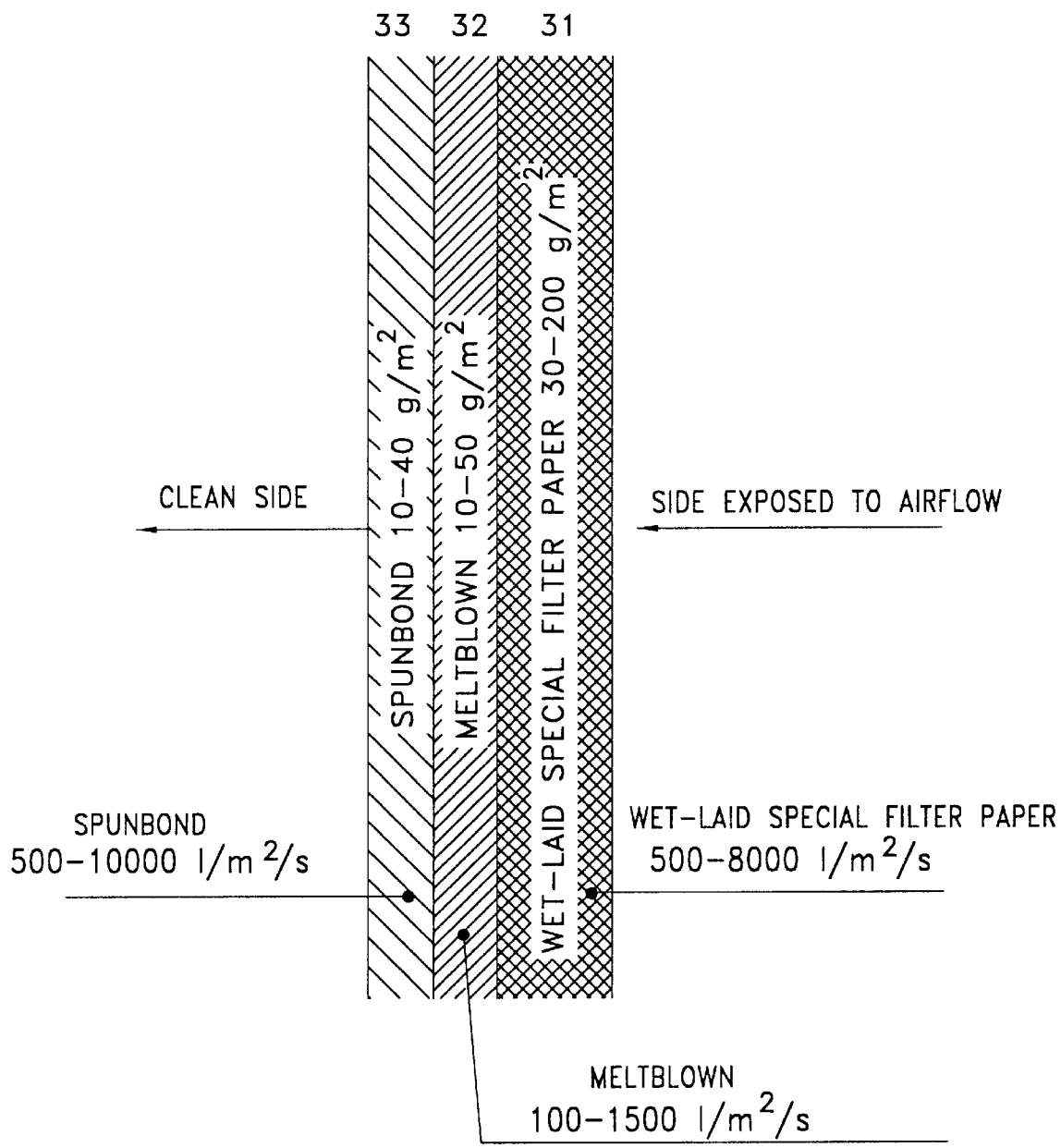
FIG. 5 is a schematic cross-section of a three-layer vacuum cleaner bag construction according to this invention in which wet-laid capacity paper is placed in front of filtration grade MB fleece. The outer layer may be a spunbond, wet-laid, dry-laid, hydroentangled nonwoven, netting or any other type of nonwoven or woven scrim.

FIG. 5 depicts the new vacuum cleaner bag construction with a 3-layer construction, in which a wet-laid capacity paper 31 is placed in front of the filtration grade MB fleece 32 and a spunbond (SB) nonwoven 33 is placed on the outside of the bag structure. The inner layer 31 may be a wet-laid, dry-laid, Spunblown (Modular), microdenier spunbond or other type of nonwoven filter that has the proper porosity and dust holding capacity. It is preferable that it has higher porosity and dust holding capacity than the standard filter paper that is used in the prior art vacuum cleaner bags. The outer coarse filter layer may be a spunbond, wet-laid, dry-laid, or hydroentangled nonwoven, netting or other type of scrim or nonwoven.

Figure 6:
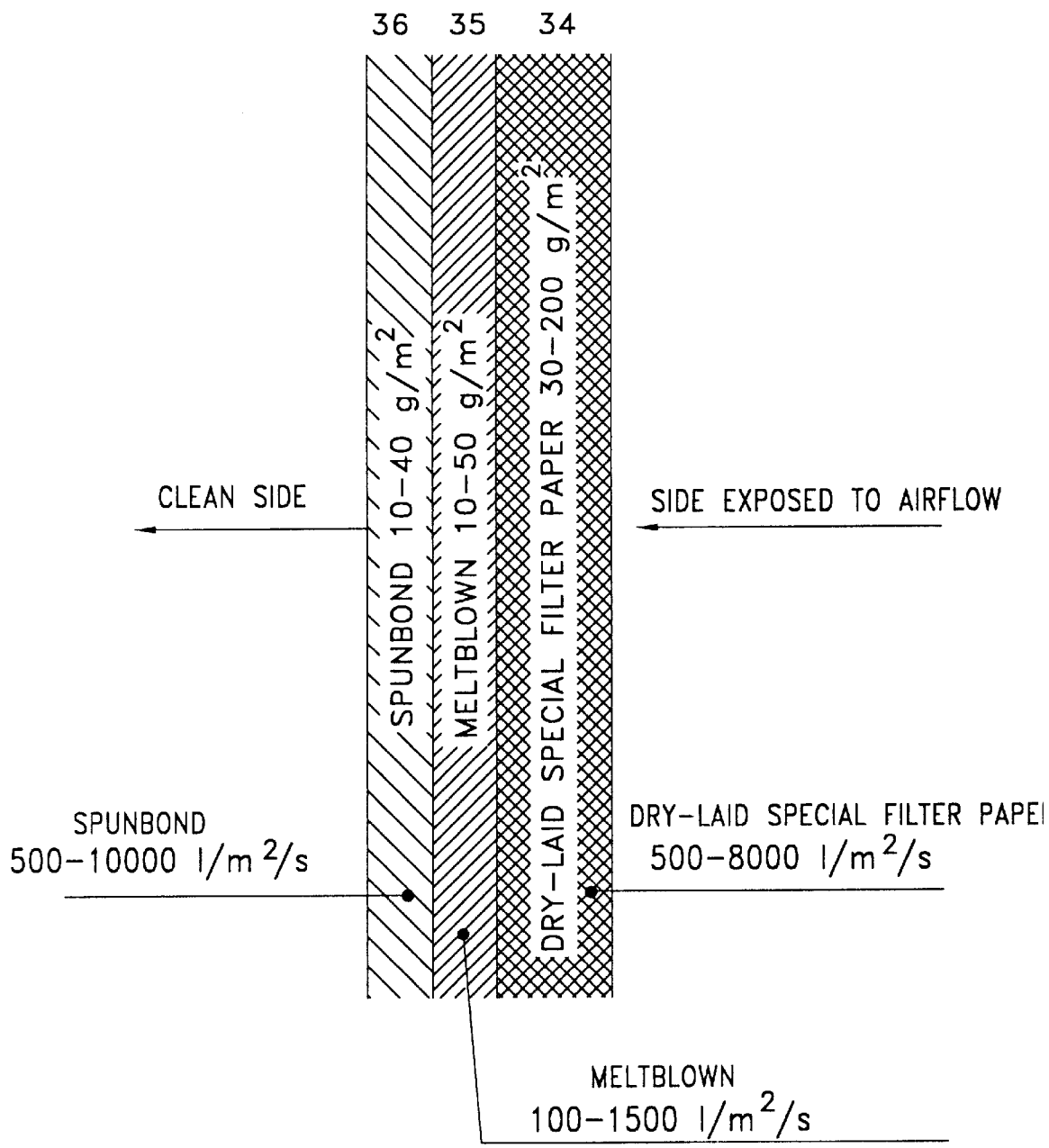
FIG. 6 is a schematic cross-section of a three-layer vacuum cleaner bag construction according to this invention in which dry-laid capacity paper is placed in front of meltblown fleece. The outer layer may be a spunbond, wet-laid, dry-laid, hydroentangled or other type of nonwoven scrim.

FIG. 6 shows a vacuum cleaner bag with the same construction as shown in FIG. 5, except a dry-laid capacity paper 34 is placed in front of the MB fleece 35, and the spunbond layer 36 is again placed on the outside of the bag. The wet- or dry-laid filter papers were placed on the inside of the bag structure to help support the MB fleece and to filter and hold the medium and larger size dust particles so that the MB fleece could effectively filter the smaller particles without clogging up.

Figure 7:
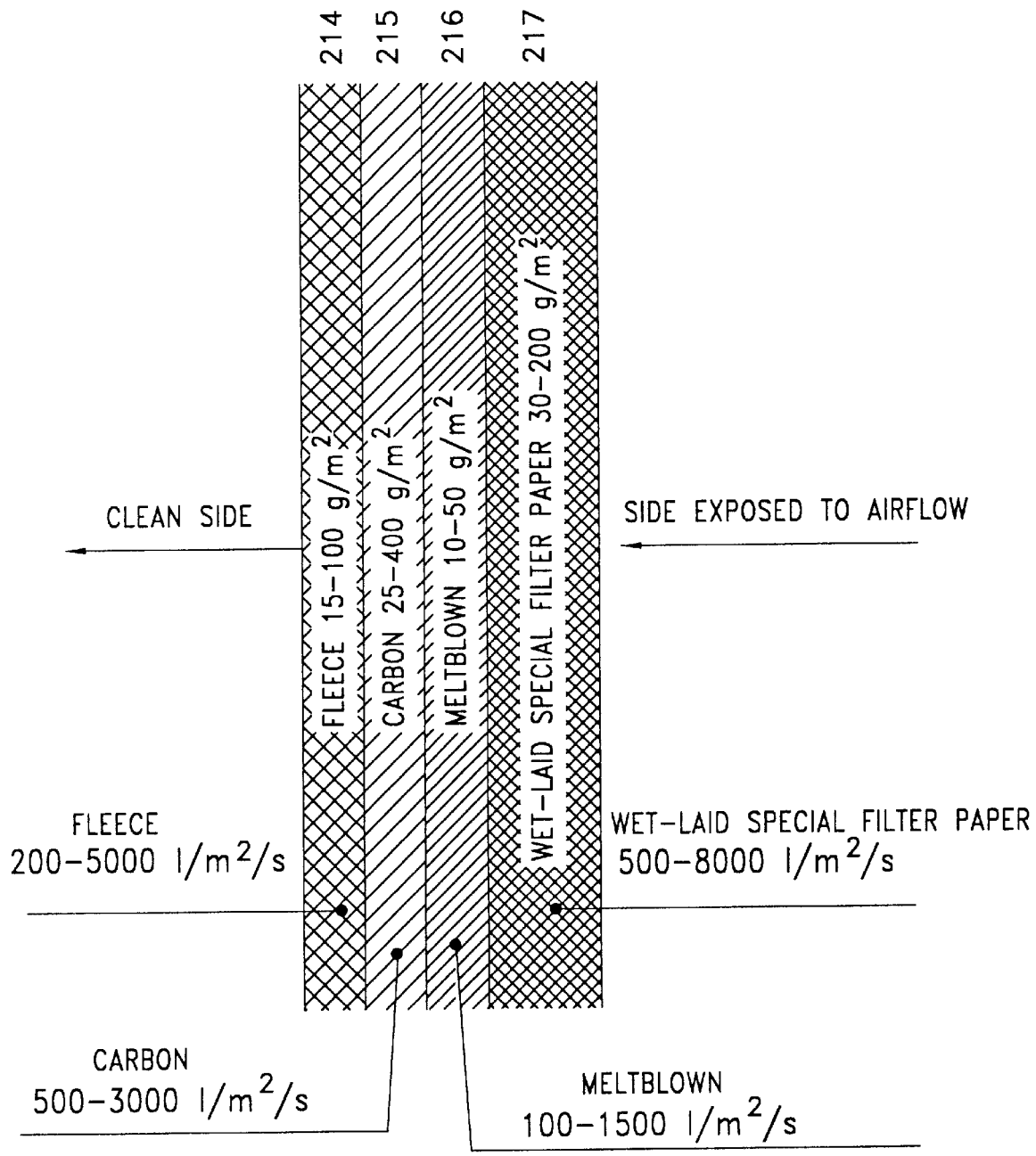
FIG. 7 is a schematic cross-section of an innovative vacuum cleaner bag of Example 7 in which a fleece/carbon layer has been placed as an odor absorption layer with basically the same filtration properties as a filter combination only filtering dust.

FIG. 7 depicts the new vacuum cleaner bag construction in which a fleece/carbon combination 214+215 of respectively 50 g/m², and 150 g/m² functioning as an odor adsorption layer is substituted for the SB 33 of FIG. 5. Important in this construction is that the fleece 214 downstream of the activated carbon fibers prevents those activated carbon fibers from getting into the bag compartment of the vacuum cleaner and therefore this fleece should preferably be electrostatically charged.

FIGS. 8A–8AA depict numerous contemplated embodiments of the novel vacuum cleaner bag construction. In FIG. 8A, a SB layer 37 forms the outside layer of the bag and serves to reinforce the bag and to protect the inner filtration grade MB fleece 38. The electrostatically charged MB fleece layer efficiently removes particles less than 0.1 $\mu$m in diameter. The vacuum cleaner bag filter paper 39 supports the MB fleece and filters and holds medium and large sized dust particles within its structure. This paper also provides the necessary rigidity for the construction to be readily fabricated into vacuum cleaner bags on standard vacuum cleaner bag making equipment. The layers in FIG. 8A are not bonded together.

The structure of FIG. 8B is the same as in FIG. 8A except a supporting wet-laid tissue fleece 43 is placed upstream of the paper 42. The supporting tissue fleece only filters out very large dust particles.

The structure of FIG. 8C is the same as 8A except that a netting scrim 47 is thermally or adhesively (with e.g., glue) sealed upstream of and to the coarse filter paper 46. That is, the scrim and coarse filter paper are bonded, preferably permanently bonded. At least any two adjacent layers of the bag can be bonded. By "permanently bonded" is meant that the bond is intended to be effective during the full normal life of the bag. Bonding can be accomplished by any suitable method such as chemical adhesive, thermal bonding and ultrasonic bonding.

In FIG. 8D, the SB outer layer 48, filtration grade MB fleece layer 49 and SB supporting layer 50 are bonded together. The filter paper layer 51 is placed upstream of the SB/MB/SB laminate, and also increases the rigidity of the bag construction so that it can be readily a fabricated into a vacuum cleaner bag on standard bag forming equipment.

In FIG. 8E, SB layer 53, MB layer 55, and filter paper layer 57 are bonded together by a porous hot melt adhesive 54 and 56. FIG. 8F is the same as FIG. 8E, except that a supporting wet-laid tissue fleece 64 is bonded to the construction by a hot melt adhesive 63. FIG. 8G is the same as FIG. 8D, except the filter paper 69 is bonded by a hot melt adhesive 68 to the bonded SB 65, MB 66 and SB 67 laminate. FIG. 8H is the same as FIG. 8G, except that the wet-laid tissue fleece 76 has been bonded to the construction by hot melt adhesive 75. FIG. 8I is the same as FIG. 8E, except that netting 82 is sealed to the construction without the use of a hot melt adhesive.

Structures shown in FIGS. 8J through 8AA all contain a fleece/carbon composite layer, functioning as an odor absorption layer. The composite comprises an activated carbon fiber layer upstream of a backing layer of fleece. In FIG. 8J a fleece/carbon combination 83+84 forms the outside, most downstream layer of the bag, filtration grade MB fleece 85 efficiently filters particles less than 0.1 $\mu$m in diameter and coarse filter paper 86 filters and holds medium to large sized dust particles within its structure.

Figure 8N:
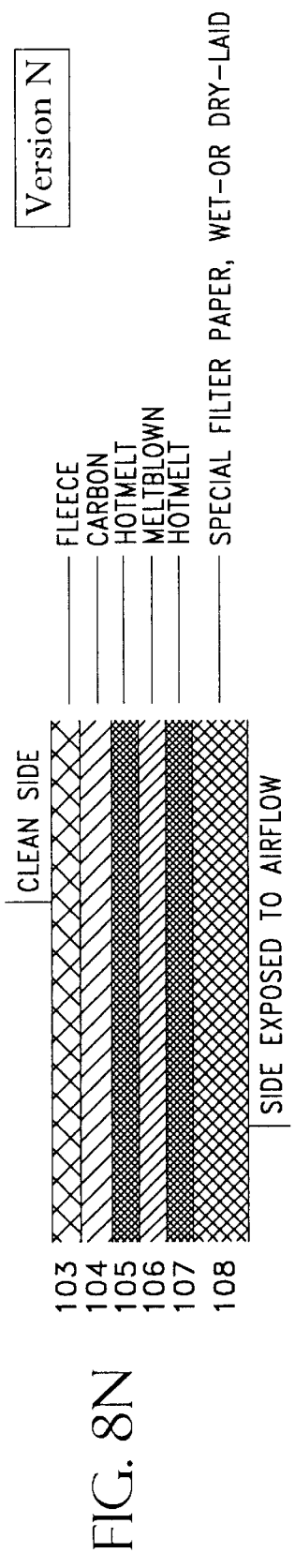
FIG. 8N is another schematic cross-section of an embodiment of the vacuum cleaner bag construction according to this invention.
Figure 8O:
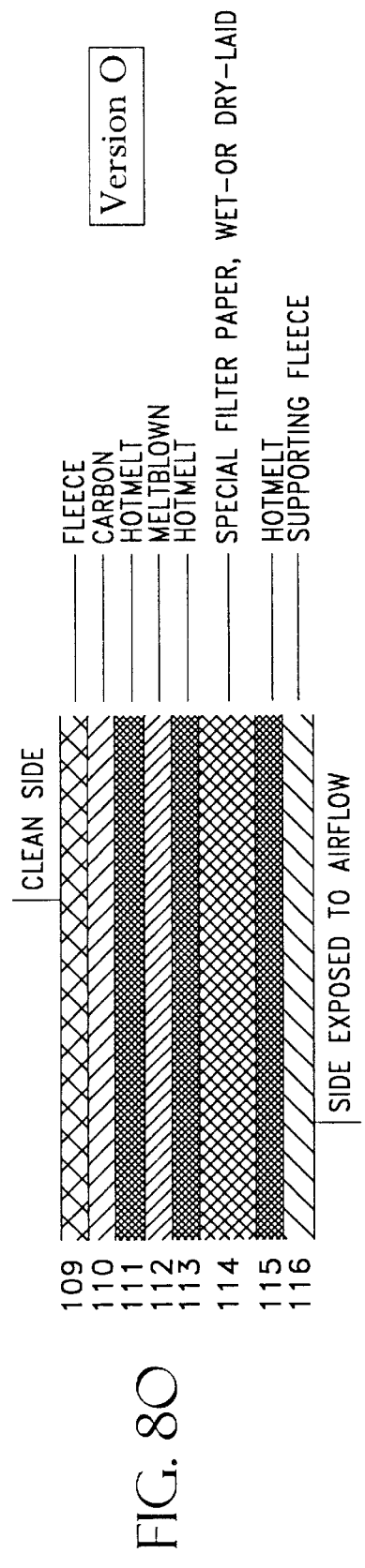
FIG. 8O is another schematic cross-section of an embodiment of the vacuum cleaner bag construction according to this invention.

FIG. 8K is the same as FIG. 8J except a supporting wet-laid fleece 91 is placed upstream of the coarse filter paper 90. The supporting fleece only filters out very large dust particles. FIG. 8L is the same as FIG. 8K, except that a netting scrim 96 is sealed to the coarse filter paper 95. In FIG. 8M the SB layer 99, MB layer 100 and SB layer 101 are bonded together which increases the rigidity of the bag construction. In FIG. 8N fleece/carbon 103+104 are bonded to filtration grade MB fleece 106 by a porous hotmelt adhesive 105. Coarse filter paper 108 is bonded in the same way to MB 106 by hotmelt adhesive 107. FIG. 8O shows a similar construction in which the supporting fleece 116 is bonded to filter paper 114 by a porous hotmelt at 115. FIG. 8P is another construction with hotmelt adhesion at 119 and 123. The SB 120 and 122 layers are bonded on opposite sides of filtration grade MB fleece 121 to increase the rigidity of the construction.

FIG. 8Q is the same as FIG. 8P, but with a porous hotmelt at 133 and a supporting fleece 134 added upstream of the coarse filter paper 132.

The structure of FIG. 8R includes a netting scrim 143 sealed to the upstream side of coarse filter paper 142. In FIG. 8S the carbon/fleece 146+147 has been moved downstream of the coarse filter paper 148, and upstream of filtration grade MB fleece 145. The MB 145 and SB 144 layers are moved to the outer side, as seen in many of the illustrated embodiments. FIG. 8T is the same as FIG. 8S, with a supporting fleece 154 placed upstream of the coarse filter paper 153. In FIG. 8U the supporting fleece of FIG. 8T has been replaced by a netting scrim 160 sealed to the coarse filter paper 159.

The structure of FIG. 8V has an outer layer of SB 161, filtration grade MB fleece 162 and SB 163 are sealed together and the carbon/fleece 164+165 between those sealed layers and the coarse filter paper 166. Layers 161, 162 and 163 preferably are thermally point-bonded with a total bonded area of 5–50%, more preferably 10–20%. Alternatively, these layers can be bonded utilizing an adhesive. Layers 164 and 165 preferably are adhesively bonded together. The three layer 161/162/163 composite and two layer 164/165 composite preferably are not bonded to each other.

In FIG. 8W, SB 169 and filtration grade MB fleece 171 are bonded together by a porous hotmelt 170, and the carbon/fleece is bonded to the coarse filter paper and MB by hotmelt adhesive layers 172 and 175. FIG. 8X is the same structure as FIG. 8W, except an extra supporting fleece 186 is bonded to the coarse filter paper 184 with a porous hotmelt adhesive 185. FIG. 8Y shows an outer composite layer of SB 187, MB 188 and SB 189 sealed together. Carbon/fleece 191/192 is bonded to this sealed outer layer and coarse filter paper by porous hotmelt adhesives 190 and 193. FIG. 8Z shows the same structure as FIG. 8Y but with a supporting fleece 204 bonded to the coarse filter paper 202 by a porous hotmelt adhesive 203.

Finally, FIG. 8AA illustrates SB 205 and filtration grade MB fleece 207 bonded together with a porous hotmelt adhesive 206. The carbon/fleece 209+210 bonded in the same way to MB 207. Coarse filter paper 212 is adhered by hotmelt 211, and a netting scrim 213 is sealed to cn coarse filter paper 212.

The activated carbon fibers layer can have the following configurations: Carbon granules between layers of nonwovens (fleece), paper with activated carbon fibers, paper with activated carbon coal, activated carbon fabrics (nonwovens), activated carbon fabrics (woven cloth), activated meltblown made of pitch and activated carbon fibers blown into a MB layer. The activated carbon layer preferably has a surface area of about 500–3000 g/m$^2$ (BET N$_2$ method) a weight in the range of about 25–500 g/m$^2$ and an air permeability of about 500–3000 L/(m$^2$×s), DIN 53887.

EXAMPLES

Methodology and Test Methods

In the following examples, unless otherwise indicated, basis weight was determined by I.S.O. 536, thickness by DIN 53 105 (0.2 bar), air permeability by DIN 53 887, tensile strength machine direction (MD) and cross machine direction (CD) by DIN 53 112, Mullen's burst pressure (MBP) by DIN 53 141, and filtration properties by T.S.I. 8160) filter tester. In the figures, air flow direction is shown by arrows.

DIN 44956-2 (April, 1980) test was employed to characterize the performance of vacuum bag filter composites with respect to filtering fine dust particles. The test basically involves filtering a 500 mg sample of SAE fine test dust through a circular 200 square centimeter of filter medium being tested using an air flow of 10 liters per second within a 30 second time period. The pressure drop through the test filter medium is measured before and after filtration. An absolute filter is employed to capture particles which pass the test filter. A coefficient of retention expressed as a percentage is calculated from the quotient of the weight of sample captured by the test filter divided by the total of the test filter-captured sample weight and the weight of sample caught by the absolute filter.

Test for Air Permeability after Fine Dust Loading: The dust loading part of the DIN 44956-2 was performed at 0.5 gram increments on seven bags of each sample. However, the pressure drop values were not recorded again. The maximum sustainable air permeability values were then determined on the bags, which had the specified levels of dust loading.

A TSI Model 8110 filter tester was used for the measurement of media filtration efficiency. With the Model 8110 tester 2.0% sodium chloride solution (20g NaCl in 1 liter of water) was aerosolized by an aerosol generator. The NaCl water drops in aerosol were heated and NaCl crystallites with a 0.1 $\mu$m diameter were formed. The mass concentration of NaCl in the air was 101 mg/m$^3$. Photometry was used to detect the volume concentration of the air in the in upstream volume of the media (Cu) and the volume concentration of the air in the downstream volume of the media (Cd). The penetration ability of the NaCl particles was calculated as:

$$\text{Penetration}=P=[Cd/CU](100\%)$$

Examples 1–3 and 4–7

Samples of various vacuum cleaner bag constructions shown in FIGS. 1–3 and 4–7 were prepared and tested. Examples 1, 2, and 3 are typical prior art construction and Examples 4, 5, 6, and 7 are representative of bags according to this invention. Characteristics of the layers of the prior art and novel bag constructions were determined and are presented in Tables III and IV. Weight, thickness, air permeability, pore diameter and filtration level permeability of the overall composites are shown in Table V. Table V also presents pressure drop and air flow through the composite at fine dust loading measured in increments from 0 to 2.5 grams by DIN 44956-2. Pressure drop data of Table V are plotted in FIGS. 9 and 10. Air flow data are graphed in FIG. 11.

Figure 9:
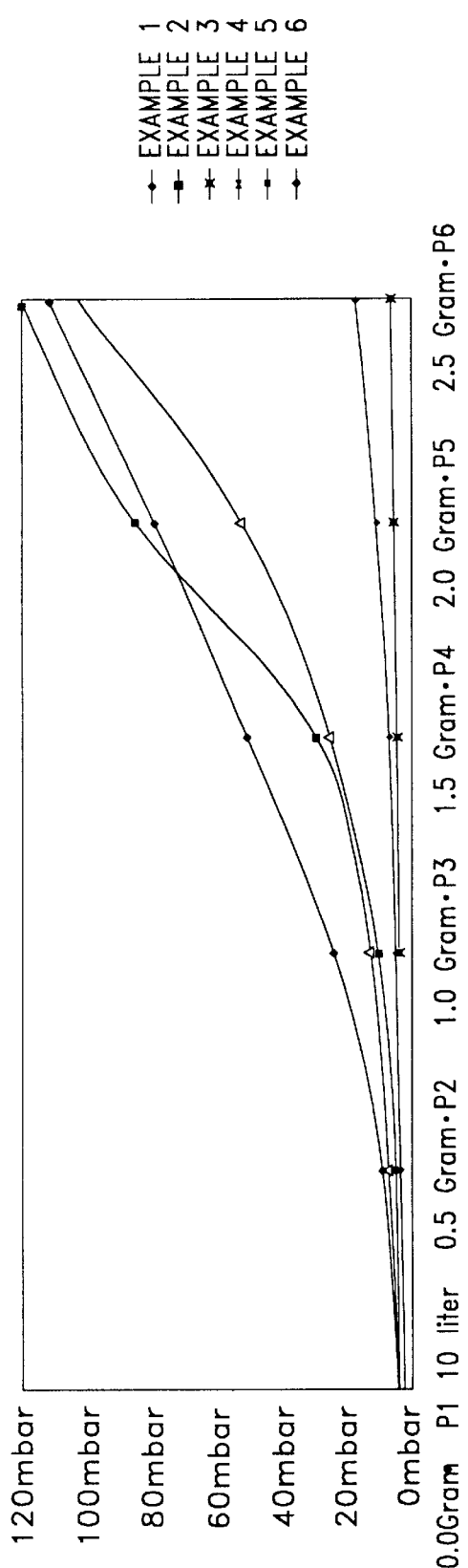
FIG. 9 is a plot of pressure drop (mbar) across vacuum cleaner bags versus Fine Dust Loading (PTI/fine) per DIN 44956-2 as performed on Examples 1–3 and 5–7.

FIG. 9 shows that the three conventional constructions, Examples 1, 2 and 3 started to notably increase in pressure drop after only 1.0 gram of dust loading. Prior art Examples 2 and 3 which both contain MB fabrics, result in much lower increases in pressure drop with dust loading up to 1.5 grams of dust. After that point, the pressure drop of both Examples 2 and 3 increase substantially with increased dust loading because the relatively small pores in the MB fabrics became clogged with dust particles and cakes.

Examples 5, 6 and 7 of this invention showed very little pressure increase, even after the maximum loading of 2.5 grams of dust. Furthermore, the initial filtration efficiencies of Examples 5–7 were all at least as high as the prior art samples containing MB fabrics at 99.6%. Example 1, which contained no MB had a lower filtration efficiency of 96%, and it had the highest pressure drop with dust loading. A distinguishing difference between Examples 2 and 3 and Examples 5–7 is that the coarse filter paper was upstream of the MB fleece in the latter three Examples. This enabled the filter paper to filter and hold the dust particles, particularly the larger dust particles, so that the filtration grade MB fleece can filter out the smaller sized dust particles without clogging up the pores, even at a loading of 2.5 g/m².

Furthermore, both the MB and the filter paper used in Examples 4, 5, 6 and 7 are notably more open than the corresponding materials used in Examples 1, 2 and 3. The special coarse filter paper is much more open, as evidenced by the high air permeability rates. Thus, the special n filter paper is able to hold more dust. Likewise, the air permeability of the MB in Examples 4, 5, 6 and 7 is much higher, and the high bulk MB nonwoven is much loftier and less dense. This is accomplished by a number of ways in the manufacture of MB, but more often this is done by increasing the die-to-collector distance to allow for greater quenching of the MB filaments so that the semi-molten filaments will have more time to cool and completely solidify before being deposited onto the collector. Water spray mists or chilled quench air may also be used to accelerate the cooling of the extruded MB filaments.

Figure 10:
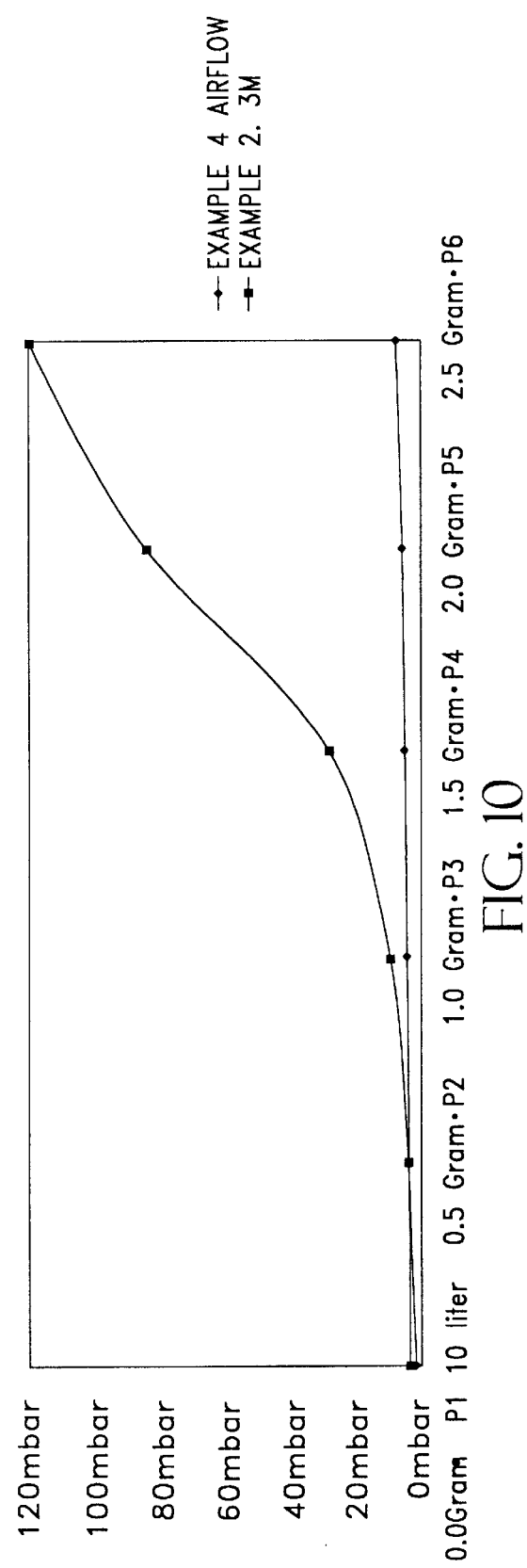
FIG. 10 is a plot of pressure drop (mbar) across vacuum cleaner bags versus Fine Dust Loading per DIN 44956–2 as performed on Example 4, Airflow and Example 2, 3M.

The differences in MB fabrics is further highlighted in FIG. 10. Example 2 from FIG. 9 is again plotted in FIG. 10 and labeled as "3M." The novel example, labeled as "Example 4, Airflo" was constructed by first making a very porous, very lofty, high bulk MB nonwoven with a weight of 120 g/m², which was used as the most upstream layer. This very MB web was loftier and more porous than the conventional MB fabrics used in Examples 2 and 3. Accordingly, it served to filter out and hold a large quantity of dust particles. Remarkably, even with the special 120 g/m² MB inner liner and a 22 g/m² center layer, the Airflo Example 4 resulted in negligible pressure drop increase with dust loading up to the maximum dust loading of 2.5 g/m².

Although Example 1 did not contain any MB fleece, and had less pressure drop increase than Examples 2 and 3, it still had substantially greater pressure drop increase with loading than did Examples 5 and 6, had MB fleeces. It should be noted that the weight of MB polypropylene web used in three of the examples was 22 g/m². Nevertheless, the proper placement of the coarse filter paper and filtration grade MB fleeces in Examples 5 and (6 resulted in dramatically lower pressure drop increase, because this enabled the filter paper to remove and hold the large and medium sized particles, and the filtration grade MB fleece only had to filter and contain the finer particles. There was little difference between Examples 5 and 6 in pressure drop, even at the highest dust loading of 2.5 grams. The pressure drop was slightly greater with the wet-laid paper because hydrogen bonding between the cellulose molecular chains during wet processing makes the wet-laid paper denser with somewhat smaller pores at the same weight.

Figure 11:
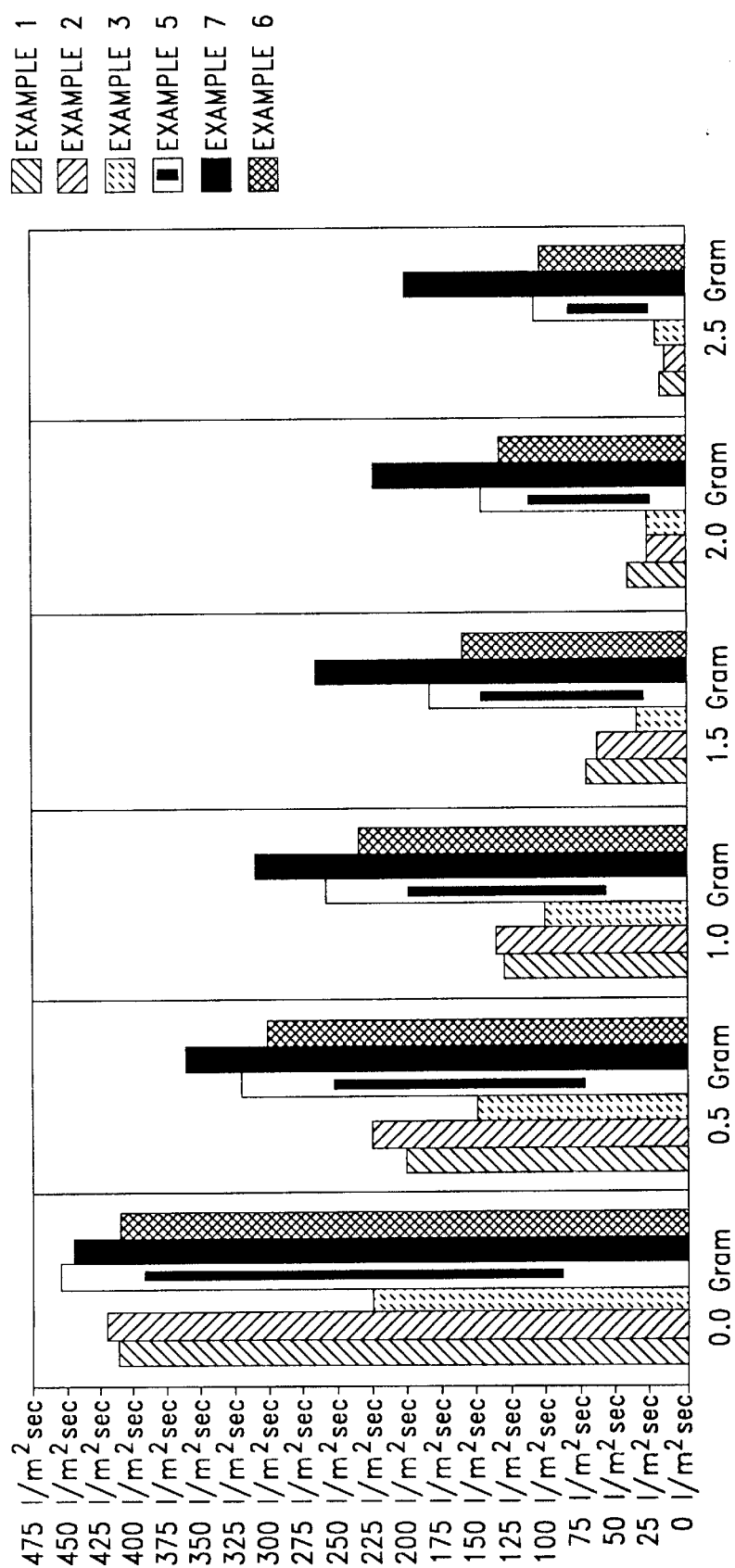
FIG. 11 is a graph showing a comparison of airflow versus Fine Dust Loading (PTI/fine).

FIG. 11 shows the results of examples which further dramatize the appreciable improvements obtained by placing a coarse filter paper upstream of the filtration grade MB fleece (on the inside of the bag) of this invention. Separate bags of Examples 1–3 and 5–7 were loaded with fine dust in 0.5 gram increments of 0, 0.5, 1.0, 1.5, 2.0 and 2.5 grams of dust. Then the six bags with different degrees of dust loading were subjected to an air permeability test in which the maximum sustainable amount of air was passed through each bag sample. As can be seen in FIG. 11, the novel bag construction, represented by Example 6 had a maximum sustainable airflow with no dust loading of 445 L/(m²×s) compared to only 225 L/(m²×s) with the prior art Example 3. At 1.5 grams of dust loading, Example 6 had a sustained airflow of 265.4 L/(m²×s)compared to only 34.9 L/(m²×s) with conventional Example 3, and at 2.5 grams of loading the performance differences were even more remarkable –199.8 and 21.9 L/(m²×s). Example 2 had a maximum sustainable airflow of 411 L/(m 2×s), but already at 1.0 gram of dust loading values drop to those of conventional bag constructions.

A conventional vacuum cleaner bag suffers from a relatively low airflow as seen by 18, 14.9 and 21.9 L/(m²×s) of Examples 1, 2 and 3 in FIG. 11 after the 6$^{th}$ dust loading. It is almost impossible to add another layer of material to these constructions without reducing the airflow dramatically. In Examples 5 and 6 of FIG. 11, due to the excellent performance of the new constructions, a possibility has been created to add more functions to the vacuum cleaner bag. In today's vacuum cleaners a number of different filters are used, amongst them active carbon filters to absorb odors. Very often 3–5 different filters are used in a vacuum cleaner, each one having its own service life.

Due to high airflow of the present invention, it is possible to increase functionality such as by adding an extra layer of active carbon fibers in the bag constructions without the need for a separate filter element. This construction has a number of advantages, namely:

1. Easier use of the vacuum cleaner for the end user, the separate, odor filter does not need to be replaced.
2. Carbon filters in their present form have a negative influence on airflow and sometimes reduce overall power of the cleaner dramatically.
3. The carbon filter is mounted in a separate plastic molded housing, that can be eliminated by the carbon layer in the vacuum cleaner bag.
4. Due to the service life of a vacuum cleaner bag, one can expect the optimal function of the active carbon fibers during the time that the vacuum cleaner bag is used.
5. As the separate plastic housing is no longer needed, the construction of the vacuum cleaner will become easier and therefore cheaper.
6. The amount of active carbon fibers can be optimized for the service life of the vacuum cleaner bag.
7. Because of the limitation of space in a vacuum cleaner, active carbon fiber filters are relatively small and very often do not have a big enough surface to absorb the odors properly.
8. By adding an extra layer of active carbon fibers to the novel bag construction, the problem of the restricted filter surface has been solved.

TABLE III

|  |  | Example 1 | | Example 3 | | |
| --- | --- | --- | --- | --- | --- | --- |
| Fig. No./Layer No. |  | 1/25 | 1/24 | 3/30 | 3/29 | 3/28 |
| Weight | ISO 536 g/m² | 45 | 13 | 45 | 22 | 13 |
| Thickness | DIN 53 105 0.2 bar mm | 0.2 | 0.05 | 0.2 | 0.26 | 0.05 |
| Air Permeability | DIN 53 887 L/(m² × s) | 400 | 2100 | 400 | 480 | 2100 |
| Tensile Strength |  |  |  |  |  |  |
| Machine Dir. | DIN 53 112 N | 37 | >6 | 37 | 2.8 | >6 |

TABLE III-continued

|  |  | Example 1 | | Example 3 | | |
| --- | --- | --- | --- | --- | --- | --- |
| Fig. No./Layer No. | | 1/25 | 1/24 | 3/30 | 3/29 | 3/28 |
| Cross Dir. | DIN 53 112 N | 20 | >1.5 | 20 | 2.9 | >1.5 |
| Pore Diameter | μm | MFP 23.43[1] | | MFP 23.43[1] | | MFP 39.57[2] |
| Mullen's Burst Pressure | DIN 53 141 bar | 1.2 | 0.3 | 1.2 | 0.5 | 0.3 |
| Filtration Properties | DIN 44956-2 | | | | | |
| Filtration Level Permeability | % | 86 | | 86 | | |

[1]Min 11.91, Max 64
[2]Min 16.52, Max >300

TABLE IV

|  |  | Example 4 | | Example 5 | | Example 6 | | Example 7 | | |
| --- | --- | --- | --- | --- | --- | --- | --- | --- | --- | --- |
| Fig. No./Layer No. | | 4/(12 + 11)[1] | 4/10 | 5/(33 + 32)[1] | 5/31 | 6(36 + 35) | 6/34 | 7/(214 + 215)[3] | 7/216 | 7/217 |
| Weight ISO 536 | g/m² | 39 | 120 | 39 | 50 | 39 | 77 | 200 | 50 | 50 |
| Thickness DIN 53 105 0.2 bar | mm | 0.33 | 1.4 | 0.33 | 0.32 | 0.33 | 0.94 | 0.9 | 0.4 | 0.32 |
| Air Permeability DIN 53 887 | L/(m² × s) | 510 | | 510 | 2900 | 510 | 1850 | 2000 | 470 | 2900 |
| Tensile Strength Machine Dir. DIN 53 112 | N | 11.6 | | 11.6 | 16 | 11.6 | 6.1 | | 2.9 | 16 |
| Tensile Strength Cross Dir. DIN 53 112 | N | 7.8 | | 7.8 | 7 | 7.8 | 5.4 | | 3 | 7 |
| Pore Diameter | μm | MFP 17.67[2] | | MFP 17.67[2] | | MFP 17.67[2] | | | MFP 7.69[2] | MFP 53.39[2] |
| Mullen's Burst Pressure DIN 53 141 | bar | | | | 0.7 | | | | 0.5 | 0.07 |
| Filtration Properties DIN 44956-2 | | | | | | | | | | |
| Filtration Level Permeability | % | 94 | | 94 | 70.5 | 94 | 87 | | | 70.5 |

[1]Spunbond (17 g/m²) plus Meltblown (22 g/m²) laminate
[2]Min 10.85, Max 40.25
[3]Fleece (50 g/m²) plus Carbon (150 g/m²) laminate, Internal surface Area BET N₂ method 1050–1400 m²/g, microporous 2 nm pore size
[4]Min 10.75, Max 40.27
[5]Min 17.67, Max >300

TABLE V

| Fig. No. | | Ex. 1 1 | Ex. 2 2 | Ex. 3 3 | Ex. 4 4 | Ex. 5 5 | Ex. 6 6 | Ex. 7 7 |
| --- | --- | --- | --- | --- | --- | --- | --- | --- |
| Weight ISO 536 | g/m² | 58 | 80 | 80 | 159 | 89 | 116 | 300 |
| Thickness DIN 53 105 0.2 bar | mm | 0.25 | 0.95 | 0.51 | 1.73 | 0.65 | 1.27 | 1.62 |
| Air Permeability DIN 53 887 | L/(m² × s) | 330 | 450 | 225 | | 465 | 420 | 400 |
| Pore Diameter | μm | | MFP 16.53[1] | | | | | |
| Filtration Properties DIN 44956-2 | | | | | | | | |
| Filtration Level Permeability | % | 96 | 99.6 | 99.6 | 99.8 | 99.7 | 99.8 | 99.7 |
| Air flow at 2 mbar | L | 6.4 | 8.19 | 4.15 | 8.6 | 8 | 7.3 | |
| Filter Resistance press. drop 1 | mbar | 3.21 | 2.26 | 5.14 | 3.46 | 2.34 | 2.53 | 2.8 |
| Filter Resistance press. drop 2 | mbar | 8.9 | 4.44 | 7.7 | 3.93 | 3.18 | 4.44 | 3.5 |
| Filter Resistance press. drop 3 | mbar | 24.19 | 10.42 | 13.37 | 4.48 | 4.35 | 10.42 | 4.91 |
| Filter Resistance press. drop 4 | mbar | 51.64 | 30.14 | 25.87 | 5.19 | 6.54 | 30.14 | 7.02 |
| Filter Resistance press. drop 5 | mbar | 79.58 | 85.7 | 53.05 | 6.15 | 10.34 | 85.7 | 11.03 |
| Filter Resistance press. drop 6 | mbar | 110 | 120 | 100.32 | 7.53 | 16.39 | 120 | 16.98 |
| Flow with fine dust 0.0 gram | L/(m² × s)* | 411 | 420 | 225 | | 455 | 445 | 410 |
| Flow with fine dust 0.5 gram | L/(m² × s)* | 200.6 | 226 | 150 | | 320 | 361 | 301 |
| Flow with fine dust 1.0 gram | L/(m² × s)* | 130.1 | 1365 | 101 | | 258 | 310 | 235 |
| Flow with fine dust 1.5 gram | L/(m² × s)* | 71 | 62.4 | 34.9 | | 183.7 | 265.4 | 162 |
| Flow with fine dust 2.0 gram | L/(m² × s)* | 44 | 27.4 | 27 | | 149.6 | 224.1 | 135 |
| Flow with fine dust 2.5 gram | L/(m² × s)* | 18 | 14.9 | 21.9 | | 109.7 | 199.8 | 105 |

[1]Min 8.45, Max 49.42
*at 2 mbar

All publications including patents referred to herein ire incorporated herein by reference. While the invention has been fully and amply described for one of average skill in the pertinent art, it should be understood that various substitutions and modifications which bring about substantially equivalent or superior results and/or performance are within the scope and the spirit of the following claims.

What is claimed is:

1. A disposable vacuum cleaner bag comprising a coarse filter layer comprising at least one of (a) a wet-laid high capacity paper, (b) a dry-laid high capacity paper, (c) a high bulk meltblown nonwoven, (d) a Spunblown (Modular) nonwoven, (e) a microdenier spunbond nonwoven positioned upstream in the direction of air flow of a filtration grade meltblown fleece.

2. The bag of claim 1 in which the filtration grade meltblown fleece layer has a basis weight of about 10–50 g/m$^2$ and air permeability of about 100–1500 L/(m$^2$×s).

3. The bag of claim 2 in which the wet-laid high dust capacity paper has a basis weight of about 30–150 g/m$^2$, air permeability of about 500–8000 L/(m$^2$×s) and pore size of at least about 160 μm, the dry-laid high dust capacity paper has a basis basis weight of about 30–150 g/m$^2$ and air permeability of about 500–8000 L/(m$^2$×s) and the high bulk meltblown nonwoven has a basis weight of about 30–180 g/m$^2$ and air permeability of about 300–8000 L/(m$^2$×s).

4. The bag of claim 1 further comprising downstream of the filtration grade meltblown fleece layer at least one outer layer comprising at least one of the following (i) a spunbond, wet-laid, dry-laid or hydroentangled nonwoven or netting having a basis weight of about 6–80 g/m$^2$ and air permeability of about 500–10,000 L/(m$^2$×s), and (ii) an odor absorbing composite comprising an activated carbon fiber layer having a basis weight of about 25–500 g/m$^2$ and air permeability of about 500–3000 L/(m$^2$×s) upstream of a backing layer of fleece having a basis weight of about 15–100 g/m$^2$ and air permeability of about 2000–5000 L/(m$^2$×s).

5. The bag of claim 1 further comprising a support layer upstream of the filtration grade meltblown fleece layer.

6. The bag of claim 5 in which the support layer is a spunbond nonwoven.

7. The bag of claim 5 in which the support layer is upstream of the coarse filter layer and is one of the following (i) a netting scrim bonded to the coarse filter layer or (ii) a wet-laid tissue fleece.

8. The bag of claim 1 in which at least one layer is of a material of suitable dielectric properties and which is electrostatically charged.

9. The bag of claim 1 in which at least one layer is bonded to an adjacent layer of the bag.

10. The bag of claim 9 in which the bonded layers are bonded with a porous hot melt adhesive.

11. The bag of claim 9 in which all adjacent layers are bonded.

12. The bag of claim 1 further comprising an odor absorbing composite upstream of the filtration grade meltblown fleece layer, the composite comprising an activated carbon fiber layer having a basis weight of about 25–500 g/m$^2$ and air permeability of about 500–3000 L/(m$^2$×s) downstream of a backing layer of fleece having a basis weight of about 15–100 g/m$^2$ and air permeability of about 2000–5000 L/m$^2$/s.

13. The bag of claim 4 in which the outer layer is spunbond nonwoven having a basis weight of about 10–40 g/m$^2$, and the coarse filter layer is high bulk meltblown nonwoven having a basis weight of about 30–180 g/m$^2$.

14. The bag of claim 4 in which the outer layer is spunbond nonwoven having a basis weight of about 10–40 g/m$^2$ and the coarse filter layer is a wet-laid high dust capacity paper having air permeability of about 500–8000 L/(m$^2$×s).

15. The bag of claim 4 in which the outer layer is spunbond nonwoven having a basis weight of about 10–40 g/m$^2$ and the coarse filter layer is a dry-laid high dust capacity paper having air permeability of about 500–8000 L/(m$^2$×s).

16. The bag of claim 1 in which the dry-laid high capacity paper comprises bicomponent fibers having a sheath of one polymer and a core of a different polymer having a melting point higher than the one polymer.

17. The bag of claim 16 in which the bicomponent fibers comprise about 25–50% of the dry-laid high dust capacity paper.

18. The bag of claim 16 in which the core is polypropylene and the sheath is polyethylene.

19. The bag of claim 16 in which the core is disposed eccentric relative to the sheath.

20. The bag of claim 16 in which the bicomponent fibers have one polymer alongside the different polymer.

21. The bag of claim 1 in which the high bulk meltblown nonwoven is electrostatically charged.

22. A filter for removing particles entrained in a gas comprising a coarse filter layer comprising at least one of (a) a wet-laid high capacity paper, (b) a dry-laid high capacity paper, (c) a high bulk meltblown nonwoven, (d) a Spunblown (Modular) nonwoven, and (e) a microdenier spunbond nonwoven positioned upstream in the direction of air flow of a filtration grade meltblown fleece layer.

23. The filter of claim 22 further comprising downstream of the filtration grade meltblown fleece layer at least one outer layer comprising one of the following (i) a nonwoven scrim of spunbond, wet-laid, dry-laid or hydroentangled fabric having a weight of about 6–80 g/m$^2$ and air permeability of about 500–12,000 L/(m$^2$×s), and (ii) an odor absorbing composite comprising an activated carbon fiber layer having a weight of about 25–500 g/m$^2$ and air permeability of about 500–3000 L/m$^2$/s upstream of a backing layer of fleece having a weight of about 15–100 g/m$^2$ and air permeability of about 2000–5000 L/m$^2$/s.

24. A method of filtering a gas comprising passing a gas entrained with particles through a filter comprising a coarse filter layer comprising at least one of (a) a wet-laid high capacity paper, (b) a dry-laid high capacity paper, (c) a high bulk meltblown nonwoven, (d) a Spunblown (Modular) nonwoven, and (e) a microdenier spunbond nonwoven positioned upstream in the direction of air flow of a filtration grade meltblown fleece layer.

25. The method of claim 24 in which the filter further comprising downstream of the filtration grade meltblown fleece layer at least one outer layer comprising one of the following (i) a nonwoven scrim of spunbond, wet-laid, dry-laid or hydroentangled fabric having a weight of about 6–80 g/m$^2$ and air permeability of about 500–12,000 L/(m$^2$×s), and (ii) an odor absorbing composite comprising an activated carbon fiber layer having a weight of about 25–500 g/m$^2$ and air permeability of about 500–3000 L/(m$^2$×s) upstream of a backing layer of fleece having a weight of about 15–100 g/m$^2$ and air permeability of about 2000–5000 L/(m$^2$×s).

* * * * *

Disclaimer

6,171,369 B1-Schultink et al., Overpelt, (BE). VACUUM CLEANER BAG CONSTRUCTION AND METHOD OF OPERATION. Patent dated Jan. 9, 2001. Disclaimer filed May 4, 2007, by the inventor.

Hereby enters this disclaimer to claims 1-25 of said patent.

*(Official Gazette February 19, 2008)*